US010919518B2

(12) United States Patent
Meyer et al.

(10) Patent No.: US 10,919,518 B2
(45) Date of Patent: Feb. 16, 2021

(54) METHODS AND SYSTEM FOR IMPROVING HYBRID VEHICLE TRANSMISSION GEAR SHIFTING

(71) Applicant: Ford Global Technologies, LLC, Dearborn, MI (US)

(72) Inventors: Jason Meyer, Canton, MI (US); Jeffrey Allen Doering, Canton, MI (US); Xiaoyong Wang, Novi, MI (US); Matthew John Shelton, Grosse Ile, MI (US); Christopher John Teslak, Plymouth, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 833 days.

(21) Appl. No.: 15/454,983

(22) Filed: Mar. 9, 2017

(65) Prior Publication Data
US 2018/0257635 A1    Sep. 13, 2018

(51) Int. Cl.
*B60W 20/00* (2016.01)
*B60W 10/02* (2006.01)
*B60W 10/06* (2006.01)
*B60W 20/15* (2016.01)
*B60W 10/08* (2006.01)
(Continued)

(52) U.S. Cl.
CPC ............. *B60W 20/15* (2016.01); *B60K 6/448* (2013.01); *B60K 6/52* (2013.01); *B60W 10/02* (2013.01); *B60W 10/06* (2013.01); *B60W 10/08* (2013.01); *B60W 10/113* (2013.01); *B60W 30/1846* (2013.01); *B60W 30/19* (2013.01); *B60K 2006/4808* (2013.01); *B60W 2510/0241* (2013.01); *B60W 2510/0275* (2013.01); *B60W 2510/104* (2013.01); *B60W 2510/1005* (2013.01); *B60W 2510/1015* (2013.01); *B60W 2510/1095* (2013.01); *B60W 2710/027* (2013.01); *B60W 2710/0666* (2013.01); *B60W 2710/083* (2013.01);
(Continued)

(58) Field of Classification Search
None
See application file for complete search history.

(56) References Cited

U.S. PATENT DOCUMENTS 6,193,628 B1    2/2001  Hrovat et al.
6,655,485 B1 *  12/2003 Ito .......................... B60K 6/387
                                                    180/65.6
(Continued)

FOREIGN PATENT DOCUMENTS

CN         105179675 A    12/2015

OTHER PUBLICATIONS

Meyer, Jason, et al., "Method and System for Improving Hybrid Vehicle Transmission Gear Shifting," U.S. Appl. No. 15/455,013, filed Mar. 9, 2017, 100 pages.

*Primary Examiner* — Charles A Fox
*Assistant Examiner* — Ryan P Dodd
(74) *Attorney, Agent, or Firm* — David Kelley; McCoy Russell LLP

(57) ABSTRACT

Methods and systems are provided for operating a driveline of a hybrid vehicle that includes an internal combustion engine, a rear drive unit electric machine, an integrated starter/generator, and a transmission are described. In one example, inertia torque compensation is provided to counter inertia torque during a power-on upshift.

5 Claims, 14 Drawing Sheets

(51) Int. Cl.
*B60W 10/113* (2012.01)
*B60K 6/448* (2007.10)
*B60K 6/52* (2007.10)
*B60W 30/184* (2012.01)
*B60W 30/19* (2012.01)
*B60K 6/48* (2007.10)

(52) U.S. Cl.
CPC ...... *B60W 2710/1022* (2013.01); *Y02T 10/62* (2013.01); *Y10S 903/93* (2013.01)

(56) References Cited

U.S. PATENT DOCUMENTS

| | | |
|---|---|---|
| 7,261,671 B2 | 8/2007 | Ortmann et al. |
| 7,713,164 B2 | 5/2010 | Silveri et al. |
| 8,061,462 B2 | 11/2011 | Soliman et al. |
| 8,137,236 B2 | 3/2012 | Soliman et al. |
| 8,224,513 B2 | 7/2012 | Soliman et al. |
| 8,706,337 B2 | 4/2014 | Rauner et al. |
| 8,795,131 B2 | 8/2014 | Yamazaki et al. |
| 8,808,141 B2 | 8/2014 | Shelton et al. |
| 9,056,610 B2 | 6/2015 | Soliman et al. |
| 9,180,876 B2 * | 11/2015 | Tsutsumi ............... B60W 20/40 |
| 2009/0118936 A1 | 5/2009 | Heap et al. |
| 2009/0233757 A1 | 9/2009 | Soliman et al. |
| 2012/0010792 A1 * | 1/2012 | Nedorezov ........... B60W 10/06 701/54 |
| 2014/0100071 A1 | 4/2014 | Kimes |
| 2014/0163827 A1 | 6/2014 | Kim |
| 2014/0171259 A1 | 6/2014 | Genise |
| 2015/0134173 A1 | 5/2015 | Choi et al. |
| 2015/0360674 A1 | 12/2015 | Nefcy et al. |

* cited by examiner

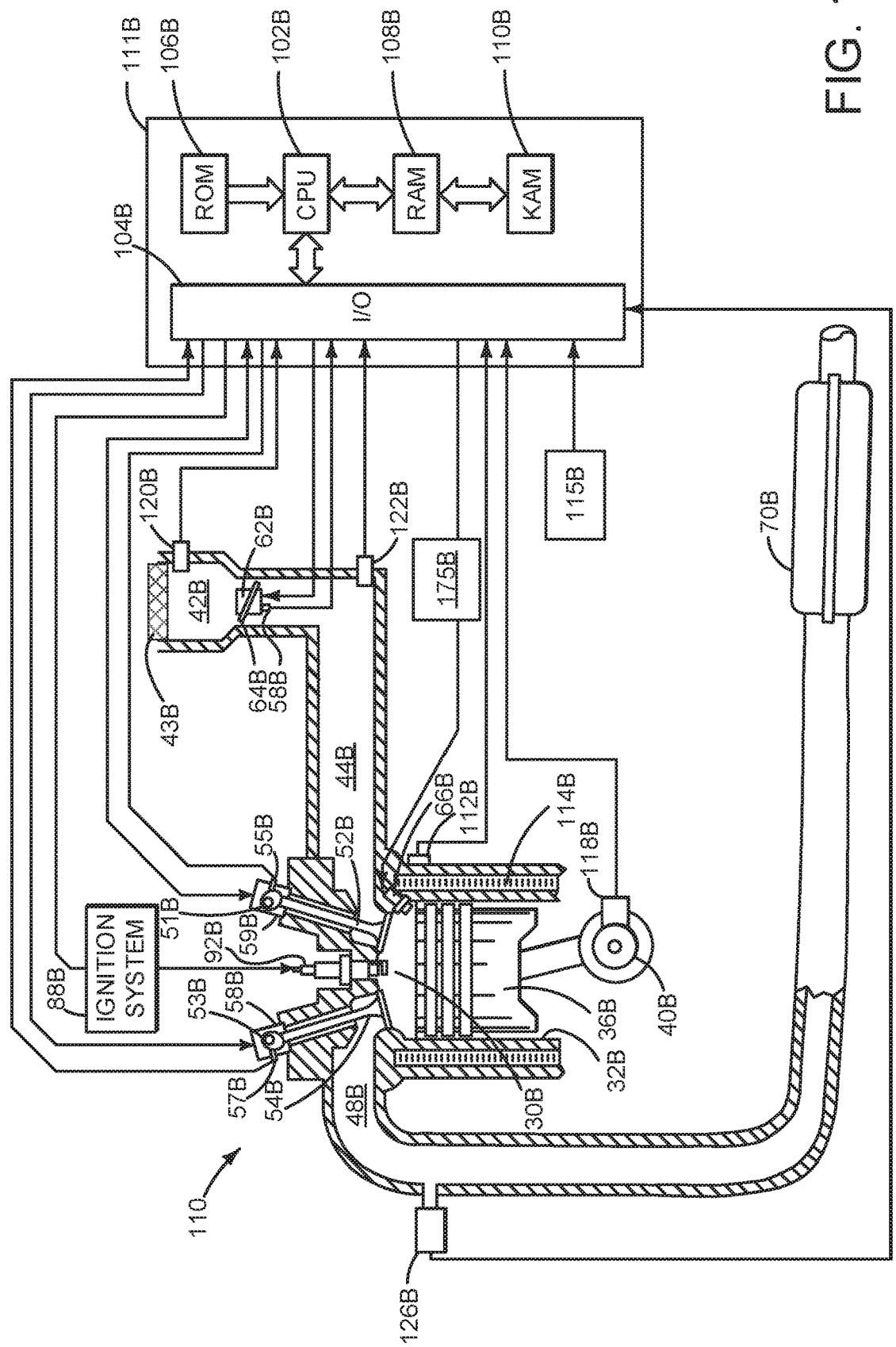

METHODS AND SYSTEM FOR IMPROVING HYBRID VEHICLE TRANSMISSION GEAR SHIFTING

FIELD

The present description relates generally to methods and systems for controlling a driveline of a hybrid vehicle. The methods and systems may be particularly useful for hybrid vehicles that include an electric machine located downstream of a transmission in the driveline.

BACKGROUND/SUMMARY

A hybrid vehicle may be configured with one or more electric machines. The electric machines may be deployed in a hybrid vehicle in several different ways. For example, electric machines may be selectively coupled to an engine in different ways including at a location upstream of a transmission, directly via a gear box, not coupled to the engine, and at a location downstream of a transmission. Placing the electric machine downstream of a transmission has some advantages such as increasing driveline efficiency by allowing the electric machine to propel the hybrid vehicle without having to rotate all rotating masses in the transmission. However, positioning the electric machine downstream of a transmission also poses some challenges. In particular, positioning an electric machine downstream of a transmission may make smooth gear shifting more challenging because engine torque may not be directly absorbed by the electric machine. Further, since the electric machine may supply torque to a driveline or absorb torque from the driveline, providing smooth transmission gear shifting may be even more difficult. Therefore, it would be desirable to provide the benefits of locating an electric machine downstream of a transmission in the direction of positive driveline torque flow while providing smooth transmission gear shifting.

The inventors herein have recognized the above-mentioned issues and have developed a driveline operating method, comprising: reducing transmission input torque to a transmission instantaneous upper threshold torque during a power-on upshift via a controller, the transmission instantaneous upper threshold responsive to a reported transmission torque ratio, transmission torque ratio in a new gear, transmission inertia, and a desired duration of the transmission upshift.

By reducing at transmission input torque during a gear shift, it may be possible to reduce driveline torque disturbances that may occur during an inertia phase of a power-on upshift. The transmission input torque may be reduced via an engine, integrated starter/generator, or rear drive unit electric machine. The reduction in transmission input torque may compensate for an increase in transmission output torque provided during an inertia phase of the power-on upshift. In addition, torque capacity of an on-coming clutch may be adjusted such that consistent transmission output torque may be provided whether the rear drive unit is supplying positive or negative torque to the driveline.

The present description may provide several advantages. In particular, the approach may improve transmission gear shift feel during power-on upshift conditions. Further, driveline torque disturbances related to transmission gear shifting may be reduced so that vehicle passengers may perceive reduced driveline noise, vibration, and harshness. In addition, transmission clutch torque capacity may be responsive to a reported transmission torque ratio to further improve transmission gear shifting.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1B is a sketch of an engine of the hybrid vehicle driveline;

DETAILED DESCRIPTION

Figure 11:
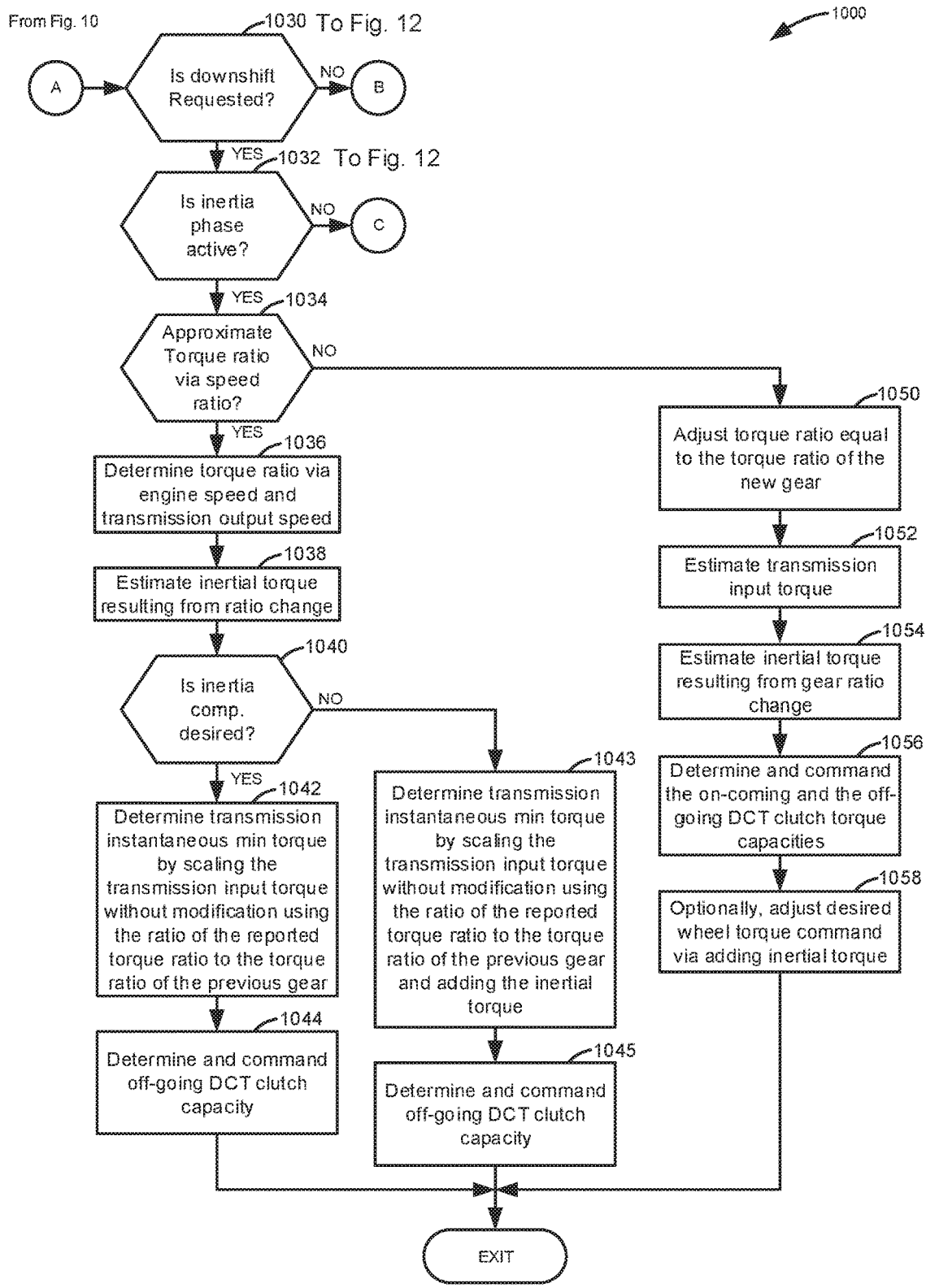
Figure 12:
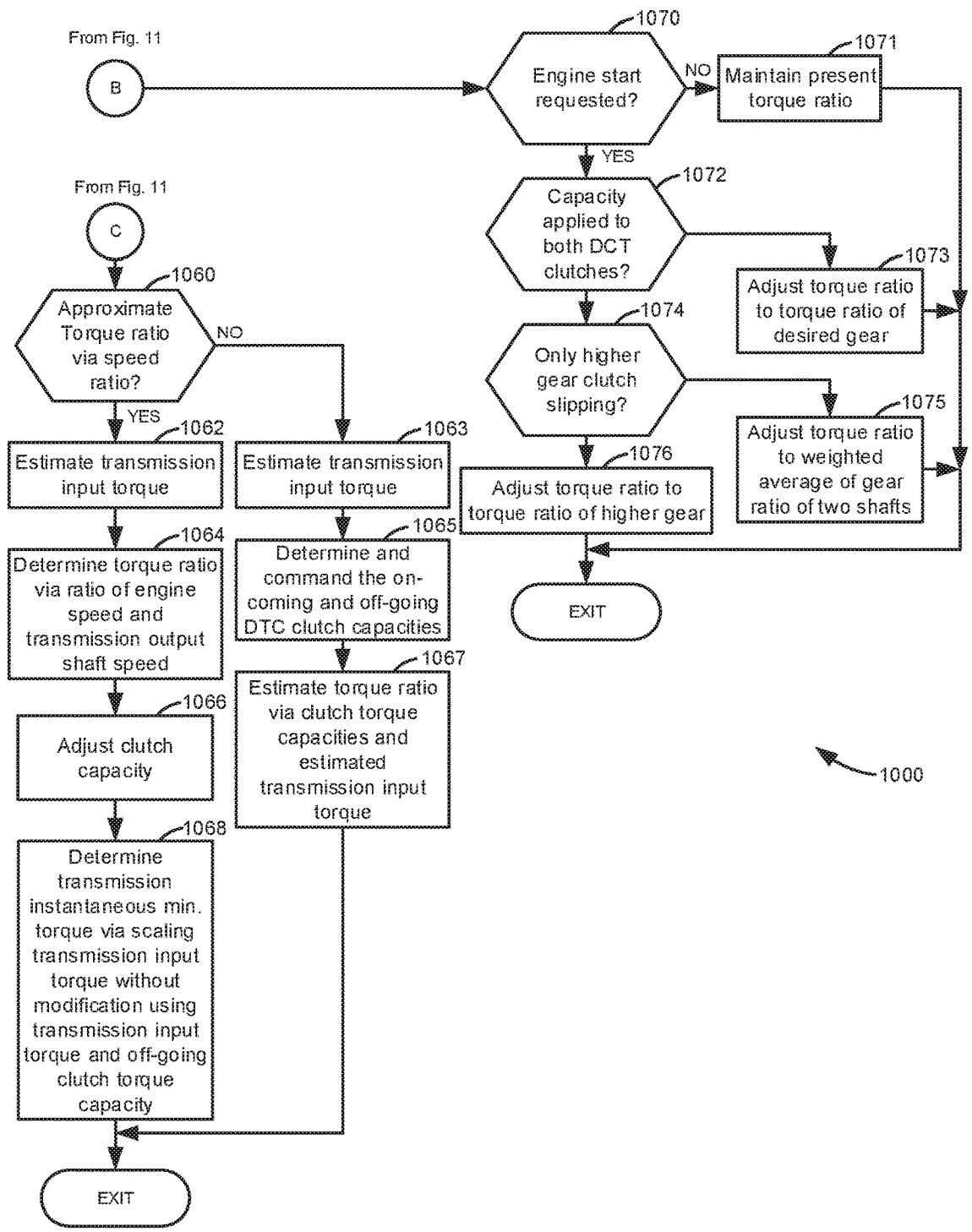

The following description relates to systems and methods for operating a driveline of a hybrid vehicle. FIGS. 1A-3 show an example hybrid vehicle system that includes a driveline with a motor, an integrated starter/generator, a dual clutch transmission, and a rear drive unit with an electric machine that is positioned downstream of the dual clutch transmission. FIG. 4 shows a method for controlling transmission gear shifting of a hybrid vehicle. The hybrid vehicle may be shifted according to the method of FIG. 4 as shown in FIGS. 5-9. The transmission gear shifting may be at least partially based on a transmission torque ratio as described in the method of FIGS. 10-12.

Figure 1A:
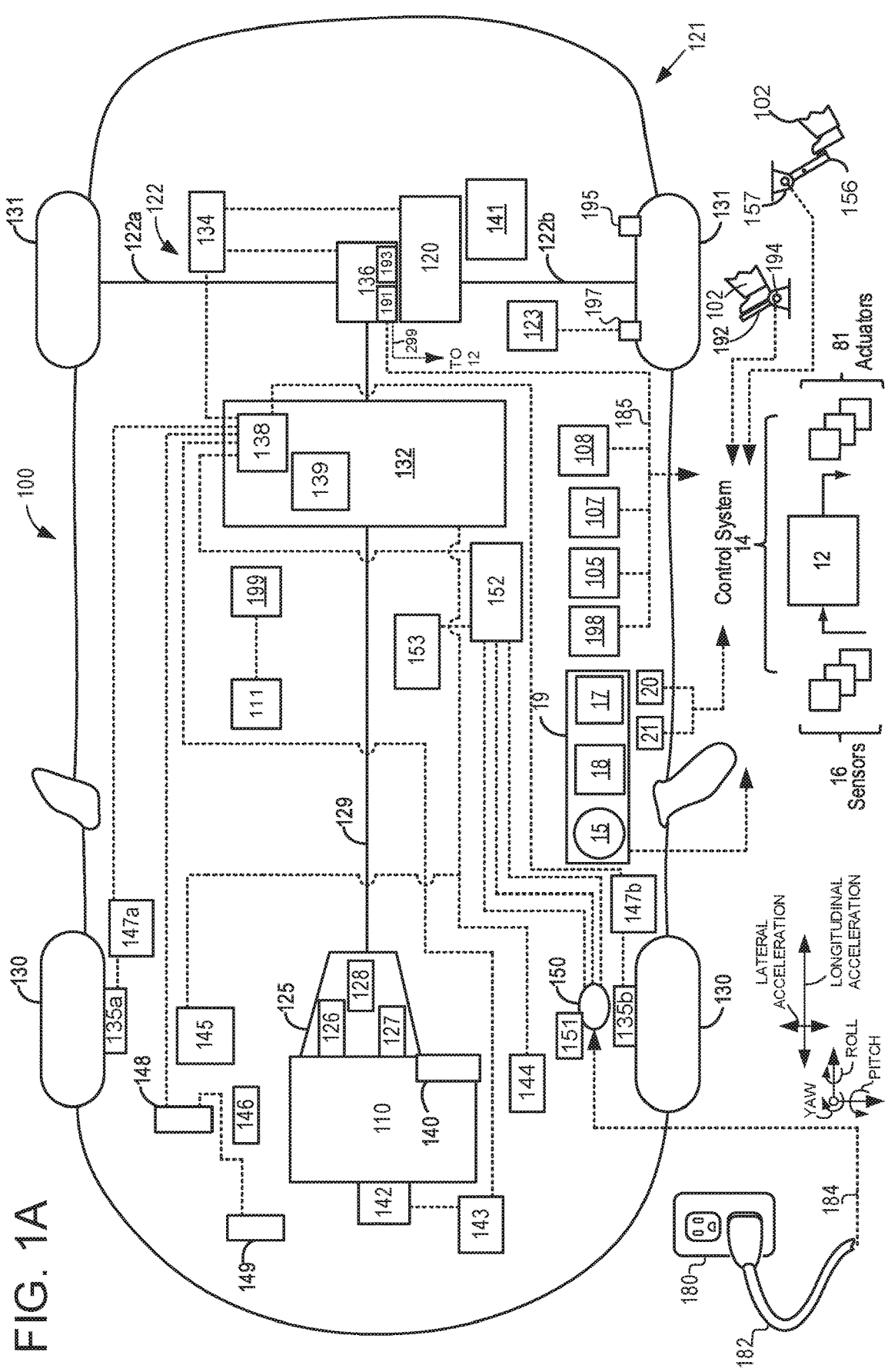
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131. Rear drive unit 136 may be directly coupled to electric machine 120 and axle 122. In some examples, a motor positioned directly downstream of transmission 125 in the direction of positive torque flow from the engine 110 may be substituted for rear drive unit 136.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard electrical energy storage device 132. Furthermore, electric machine 120 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

Figure 1C:
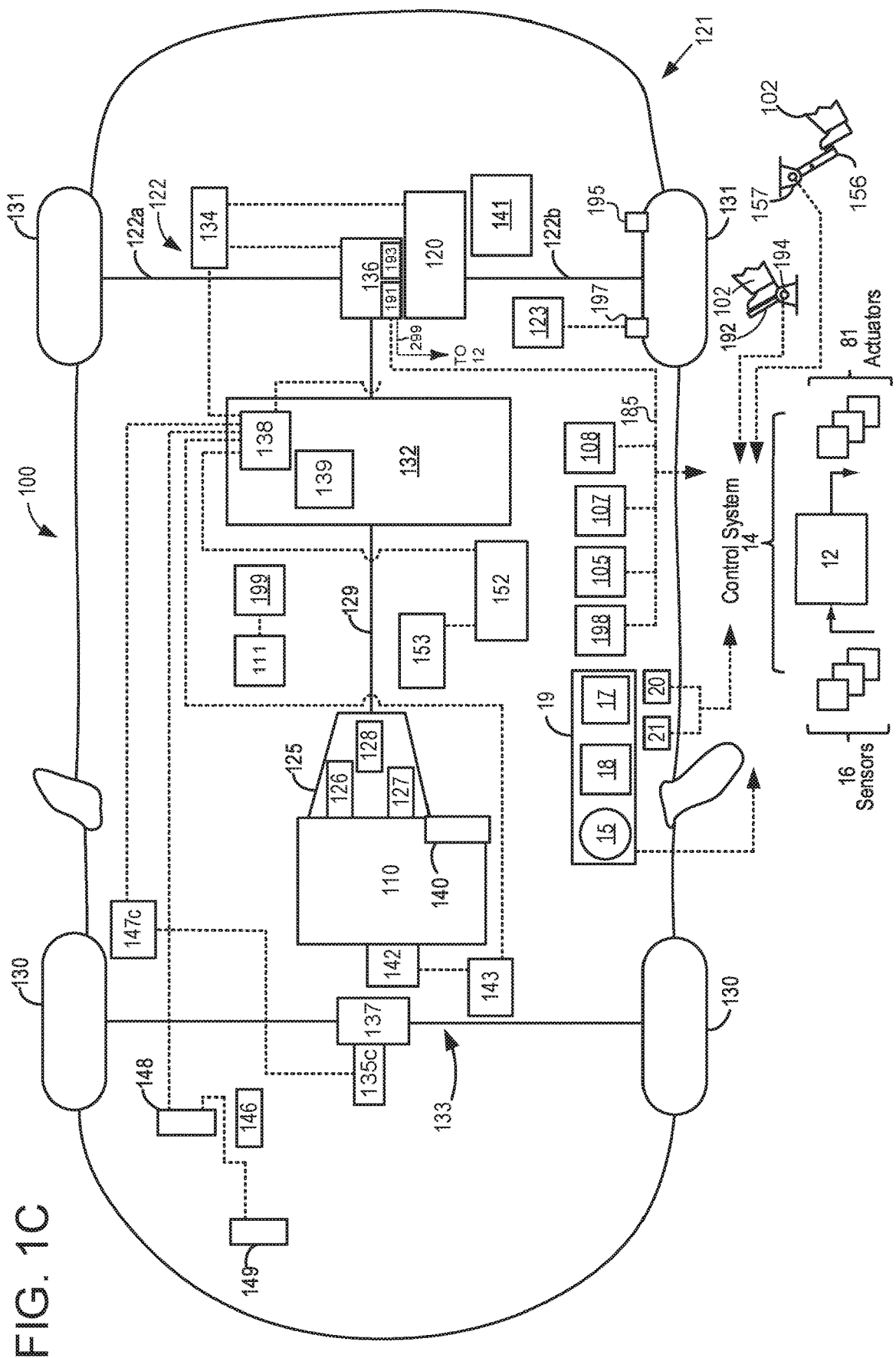
FIG. 1C is a schematic diagram of an alternative hybrid vehicle driveline.

In some examples, vehicle propulsion system 100 may include one or more electric machines 135*a* and 135*b* to propel vehicle 121 or to provide regenerative braking via front wheels 130. Third inverter (ISC3) 147*a* may convert alternating current generated by electric machine 135*a* to direct current for storage at the electric energy storage device 132 or provide alternating current to electric machine 135*a* to propel vehicle 121. Likewise, fourth inverter (ISC4) 147*a* may convert alternating current generated by electric machine 135*b* to direct current for storage at the electric energy storage device 132 or provide alternating current to electric machine 135*b* to propel vehicle 121. Electric machines 135*a* and 135*b* may be collectively referred to as front wheel electric machines. Alternatively, a single front wheel electric machine may drive and/or provide regenerative braking to both front wheels 130 as shown in FIG. 1C.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B.

Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

FIG. 1C is a schematic of an alternative hybrid vehicle driveline. The components of the hybrid vehicle driveline shown in FIG. 1C that are the same as the components shown in FIG. 1A are identified with the same numbering used in FIG. 1A. Components that are unique to the configuration of FIG. 1C are identified with new component numbers. In this configuration, the hybrid vehicle driveline includes a front axle 133. Electric machine 135c may provide positive or negative torque to front wheels 130 via front differential 137. In some examples, the electric machine 135c and the differential 137 are considered part of front axle 133. Thus, front axle 133 may provide regenerative braking or torque to propel vehicle 121. Further, electric machine 135c may receive electrical power from, or provide electrical power to, electric energy storage device 132. Front axle 133 may be referred to as an independently driven axle. The other components shown in FIG. 1C may operate as previously described.

Figure 2:
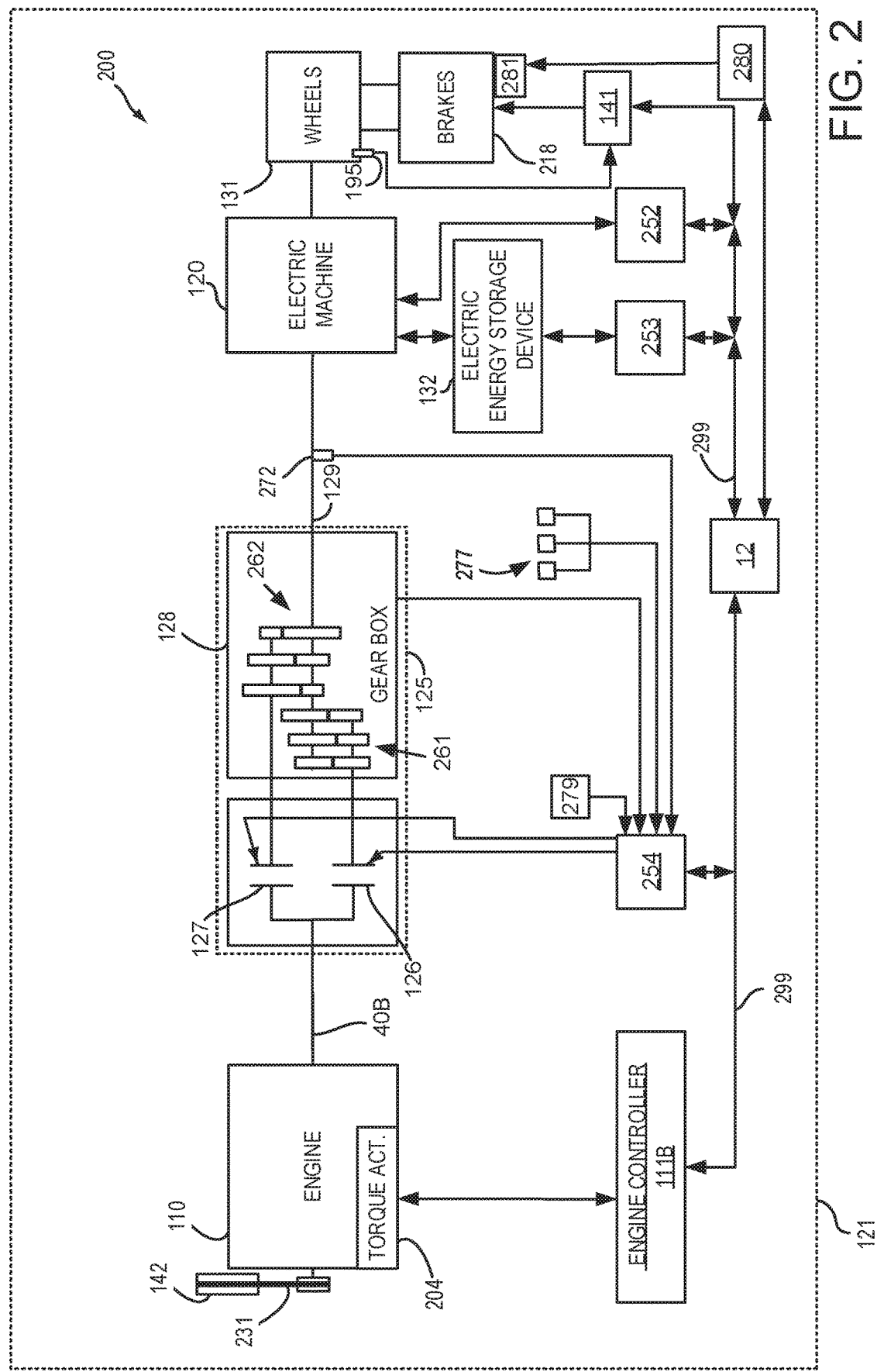
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIG. 1A-1B. Other components of FIG. 2 that are common with FIG. 1A are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Figure 3:
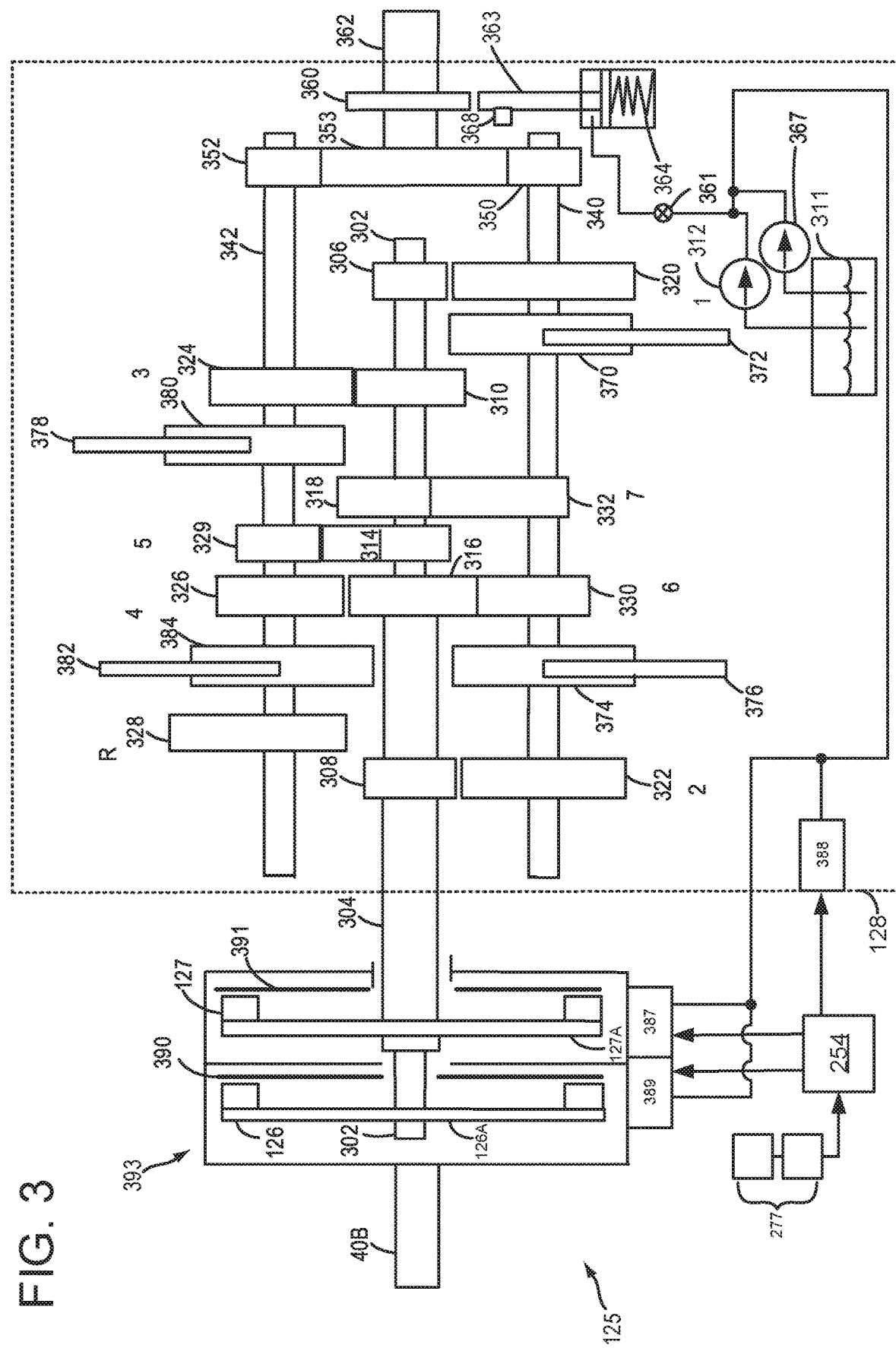
FIG. 3 is a schematic diagram of a dual clutch transmission located in the hybrid vehicle driveline.
Figure 4:
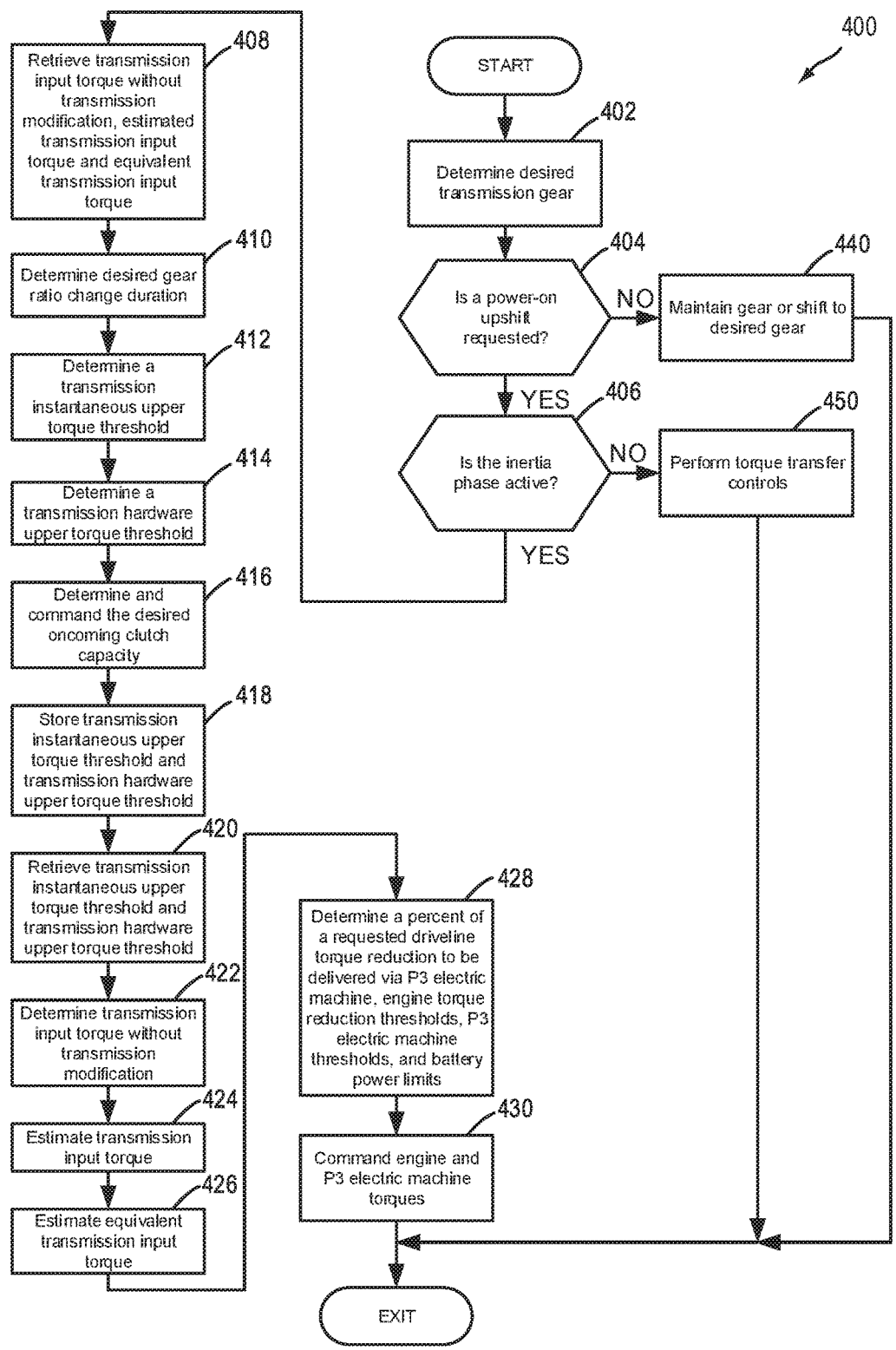
FIG. 4 is a flowchart of a method for shifting gears of a transmission.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 329, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, transmission fork position sensors for detecting positions of selector forks (e.g. 372, 376, 378, 382), and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor.

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352.

Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Referring now to FIG. 4, an example method for operating a hybrid driveline to improve transmission gear shifting is shown. The method of FIG. 4 may be incorporated into and may cooperate with the system of FIGS. 1A-3. Further, at least portions of the method of FIG. 4 may be incorporated as executable instructions stored in non-transitory memory while other portions of the method may be performed via a controller transforming operating states of devices and actuators in the physical world.

At 402, method 400 determines a desired transmission gear. In one example, method 400 determines a desired transmission gear in response to vehicle speed and accelerator pedal position or a demanded wheel torque determined from accelerator pedal position. In particular, method 400 indexes a transmission shift schedule stored in controller memory. The transmission shift schedule may be a table or function that holds empirically determined transmission gears. The vehicle speed and accelerator pedal position index memory locations and the table or function outputs the desired transmission gear. Method 400 proceeds to 404 after determining the desired transmission gear.

At 404, method 400 judges if a power-on upshift is requested. A power-on upshift is a gear shift from a lower gear (e.g., $1^{st}$ gear) to a higher gear (e.g., $2^{nd}$ gear) while driver demand torque is greater than zero. The driver demand torque is greater than zero when the accelerator pedal is applied or depressed. A power-on upshift may be requested when the desired gear changes from a lower gear to a higher gear (e.g., shifts from $2^{nd}$ gear to $3^{rd}$ gear) when the accelerator pedal is applied. If method 400 judges that a power-on upshift is requested, the answer is yes and method 400 proceeds to 406. Otherwise, the answer is no and method 400 proceeds to 440.

At 440, method 400 maintains the present transmission gear or shifts to a desired transmission gear (e.g., downshifts). Method 400 shifts according to a shift schedule in response to accelerator pedal position and vehicle speed. Alternatively, method 400 may hold the present gear engaged. Method 400 proceeds to exit after the transmission gear is shifted or maintained.

At 406, method 400 judges if an inertia phase of the gear shift is active. A power-on transmission gear upshift is comprised of two phases. The first phase is a torque phase or a torque transfer phase and it is a time during the shift where the off-going clutch is opening, but still transferring torque, and the on-coming clutch is closing and beginning to transfer torque. For the dual clutch transmission shown in FIG. 3, the on-coming clutch may be clutch 126 or clutch 127. The off-going clutch may be clutch 126 or clutch 127. For example, the off-going clutch for a particular gear shift may be clutch 126 and the on-coming clutch may be clutch 127. The torque transfer phase ends when the off-going clutch torque capacity is zero and the on-coming clutch torque capacity is equal to the transmission input torque. The second phase of the transmission gear shift is an inertia phase and it begins after the torque transfer phase of the gear shift. In one example, method 400 may determine that the inertia phase is active in response to modeled transmission states. If the output from the transmission model indicates that the transmission gear shift is in an inertia phase, the answer is yes and method 400 proceeds to 408. Otherwise, the answer is no and method 400 proceeds to 450.

At 450, method 400 adjusts force applied to the off-going clutch and force applied to the on-coming clutch during the torque transfer phase of the power-on upshift. The force applied to the off-going clutch controls a torque transfer capacity (e.g., the amount of torque the clutch may transfer from an input side of the clutch, such as the engine side of the clutch, to an output side of the clutch, such as the gearbox side of the clutch). Similarly, the force applied to the on-coming clutch controls the torque transfer capacity of the on-coming clutch. In one example, method 400 determines and commands the on-coming clutch torque capacity via the following equation:

$$Tq_{on\_clth\_cap} = \left(\frac{RT_{gear\_old}}{RT_{gear\_new}}\right) \cdot Tq_{Trn\_wo\_mod} \cdot \frac{t}{T_{ttp\_dur}}$$

where $Tq_{on\_clth\_cap}$ the torque capacity of the on-coming clutch, $RT_{gear\_old}$ the torque ratio on clth cap is old is (e.g., output torque of the transmission divided by input torque of the transmission when the old gear is engaged) of the transmission operating in the gear being disengaged (e.g., the old gear), $RT_{gear\_new}$ is the torque ratio of the transmission operating in the gear being engaged (e.g., the new gear), $Tq_{Trn\_wo\_mod}$ is the transmission input torque without modification, t is the amount of time elapsed from the start of the torque transfer phase of the present gear shift, $T_{ttp\_dur}$ is the desired duration of the torque transfer phase of the present gear shift. The on-coming clutch is commanded to the value of $Tq_{on\_clth\_cap}$. However, if driveline torque modification is performed by the rear drive unit electric machine instead of the engine and the integrated starter/generator to fill a potential torque hole during the torque transfer phase, then the clutch torque capacity will have a different ending torque capacity. The final clutch torque capacity at the end of the torque transfer phase may be the transmission input torque without modification. Thus, the on-coming clutch torque capacity may be described by the following equation when the rear drive unit electric machine is providing compensation during the torque phase of the power-on upshift:

$$Tq_{on\_clth\_cap} = Tq_{Trn\_wo\_mod} \cdot \frac{t}{T_{ttp\_dur}}$$

where $Tq_{Trn\_est}$ is estimated transmission input torque. The difference between the on-coming clutch torque capacity and the requested transmission maximum instantaneous input torque may be used to determine how fast the transmission gear ratio change occurs according to the following equation:

$$Tq_{Trn\_inst\_max} = Tq_{on\_clth\_cap} - J_{Trn\_in} \frac{\omega_{Trn\_out}(RT_{gear\_old} - RT_{gear\_new})}{T_{shft\_dur}}$$

where $Tq_{Trn\_inst\_max}$ is the transmission input maximum instantaneous torque limit, $J_{Trn\_in}$ is the transmission effective input inertia, $\omega_{Trn\_out}$ is the transmission output shaft angular speed, $Tq_{on\_clth\_cap}$ is the torque capacity of the on-coming clutch, $RT_{gear\_new}$ is the torque ratio of the transmission while operating in the new gear, $RT_{gear\_old}$ is the torque ratio of the transmission operating in the old gear, and $T_{shft\_dur}$ is the duration of the shift or gear ratio change. The transmission input maximum instantaneous torque limit may alternatively be referred to as the transmission input upper instantaneous torque threshold, and it is a transmission input torque that is not to be exceeded.

The transmission input minimum instantaneous torque limit may be determined to limit transmission input torque by the engine and/or integrated starter/generator. In one example, the transmission input minimum instantaneous torque limit from the following equation:

$$Tq_{Trn\_min\_inst} = Tq_{Trn\_wo\_mod} + \left(\frac{RT_{gear\_old}}{RT_{gear\_new}} - 1\right) \cdot Tq_{on\_clth\_cap}$$

where $Tq_{Trn\_min\_inst}$ is the transmission input instantaneous minimum torque limit, $RT_{gear\_old}$ is the transmission torque ratio when the old gear is engaged, $RT_{gear\_new}$ is the transmission torque ratio when the new gear is engaged, $Tq_{Trn\_wo\_mod}$ is transmission input torque without modification, and $Tq_{on\_cltch\_cap}$ is the torque capacity of the on-coming clutch. The second term of the above equation $$\left(e.g., \left(\frac{RT_{gear\_old}}{RT_{gear\_new}} - 1\right) \cdot Tq_{on\_clth\_cap}\right)$$

is torque applied to fill potential torque holes during the torque transfer phase of the gear shift. The transmission input minimum instantaneous torque limit may alternatively be referred to as the transmission input lower instantaneous torque threshold, and it is a torque that transmission input torque is not to be less than. The off-coming clutch may be released at a predetermined rate in response to the gears participating in the power-on upshift. Method 400 proceeds to exit executing the torque transfer portion of the transmission gear shift.

At 408, method 400 retrieves transmission control variable from memory. In one example, a transmission controller may retrieve the control variables from an engine controller via the vehicle system controller and CAN bus. Specifically, method 400 retrieves transmission input torque without modification, estimated transmission input torque, and equivalent transmission input torque from memory. Method 400 proceeds to 410.

At 410, method 400 determines a desired gear ratio change duration. The desired gear ratio change duration, or an amount of time for a gear shift to occur, may be stored in memory. The desired gear ratio change duration values stored in memory may be empirically determined and stored in tables or functions that may be indexed by driver demand wheel torque and gears included in the gear shift. The desired gear ratio change duration may be determined via the transmission controller. Method 400 proceeds to 412 after determining the desired gear ratio change duration.

At 412, method 400 determines a transmission maximum instantaneous upper torque threshold or limit that is not to be exceeded. The transmission input instantaneous upper torque threshold may also be referred to as a transmission input maximum instantaneous torque limit. In one example, method 400 determines the transmission input maximum instantaneous torque limit from the following equation:

$$Tq_{Trn\_max\_inst} = \frac{RT_{rep}}{RT_{gear\_new}} Tq_{Trn\_wo\_mod} - J_{Trn} \frac{\omega_{Trn}(RT_{gear\_old} - RT_{gear\_new})}{T_{shft\_dur}}$$

where $Tq_{Trn\_max\_inst}$ is the transmission input instantaneous maximum torque limit, $RT_{rep}$ is the reported torque ratio which is determined from a ratio of the transmission input speed to the transmission output speed, $RT_{gear\_new}$ is the torque ratio of the new gear, $Tq_{Trn\_wo\_mod}$ is transmission input torque without modification, $J_{Tm}$ is transmission input effective inertia, $\omega_{Tn}$ is transmission output angular speed, $RT_{gear\_old}$ is torque ratio of old gear, $RT_{gear\_new}$ is torque ratio of the new gear, and $T_{shft\_dur}$ is the ratio change duration. The value of $J_{Tm}$ may be empirically determined and stored in controller memory. Likewise, the new and old gear torque ratios may be stored in controller memory. The value of $\omega_{Tn}$ may be determined via a speed sensor and $Tq_{TnTq\_wo\_mod}$ is determined at step 424. The transmission maximum instantaneous upper torque threshold may be determined via the transmission controller. The reported torque ratio may be determined as described in FIGS. 10-12. Method 400 proceeds to 414.

At 414, method 400 determines a transmission hardware upper torque threshold or limit not to be exceeded. The transmission hardware upper torque threshold or limit may also be referred to as a transmission maximum hardware torque limit. In one example, method 400 determines the transmission hardware upper torque threshold from one or more functions that hold empirically determined transmission hardware upper torque threshold values. The functions may have transmission variables including clutch temperature, transmission oil temperature, and other transmission operating conditions as inputs. The output of the functions may be summed to provide an estimate of the transmission hardware upper torque threshold. The transmission hardware upper torque threshold may be determined via the transmission controller. Method 400 proceeds to 416.

Figure 10:
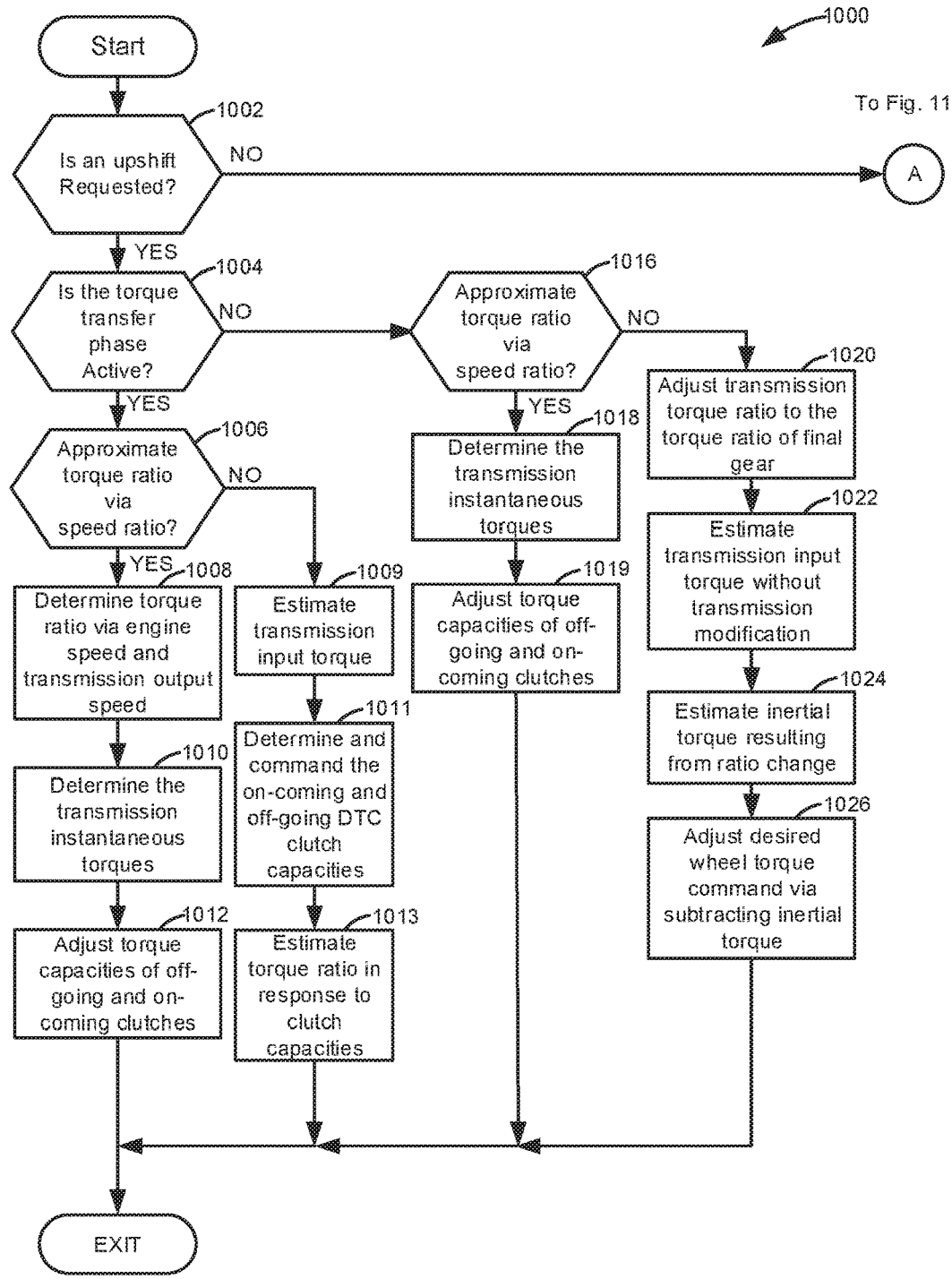
FIGS. 10-12 show an example method for determining transmission torque ratio for facilitating transmission gear shifting.

At 416, method 400 determines and commands the desired on-coming clutch torque capacity. In one example, method 400 determines the on-coming clutch torque capacity via the following equation:

$$Tq_{on\_clth\_cap} = \frac{RT_{reported}}{RT_{gear\_new}} \cdot Tq_{Trn\_wo\_mod} + (Tq_{Trn\_est} - Tq_{Trn\_eqv})$$

where $Tq_{on\_clch\_cap}$ is the torque capacity of the on-coming clutch, $RT_{reported}$ is the reported transmission torque ratio as determined via the method of FIG. 10, $RT_{gear\_new}$ is the transmission torque ratio when the transmission is engaged in the new gear, $Tq_{Trn\_wo\_mod}$ is the transmission input torque without modification, $Tq_{Trn\_est}$ is the estimated transmission input torque, and $Tq_{Trn\_eqv}$ is the transmission equivalent input torque. The torque capacity of the on-coming clutch is commanded to the value of $Tq_{on\_clch\_cap}$. The on-coming clutch torque capacity may be determined via the transmission controller. Method 400 proceeds to 418.

At 418, method 400 stores the transmission instantaneous upper torque threshold and transmission hardware upper torque threshold to memory. The thresholds are stored to memory for later use or use of the engine or vehicle system controller. Method 400 proceeds to 420.

At 420, method 400 retrieves the transmission instantaneous upper torque threshold and the transmission hardware upper torque threshold from memory. The engine controller or the vehicle system controller may retrieve the threshold values. Method 400 proceeds to 422.

At 422, method 400 determines transmission input torque without transmission modification. As previously discussed, the vehicle system controller may receive various inputs for requesting braking torque and torque to accelerate the vehicle. For example, the torque to accelerate the vehicle may be input through an accelerator pedal or via an interface with an autonomous driver. In one example, the torque to accelerate the vehicle is a wheel torque that is determined from vehicle speed and accelerator pedal position or a voltage. Specifically, vehicle speed and accelerator pedal position are inputs to a table or function, and the table or function outputs a driver demand wheel torque from a plurality of empirically determined values stored in the table or function. The wheel torque may then be split or partitioned into a driver demand engine torque, driver demand integrated starter/generator torque (if present), and driver demand rear drive unit electric machine torque. The driver demand engine torque, driver demand integrated starter/generator torque, and driver demand rear drive unit electric machine torque may be partitioned in response to battery state of charge, integrated starter/generator temperature, rear drive unit electric machine temperature, and other vehicle conditions. The driver demand engine torque adjusted for transmission gear ratio and rear drive unit gear ratios, plus the driver demand integrated starter/generator torque adjusted for transmission gear ratio and rear drive unit gear ratios, plus the driver demand rear drive unit electric machine torque adjusted for rear drive unit gear ratios or any other torques of motor position downstream of the transmission or connected to an independently driven axle, sum to the driver demand wheel torque when the transmission is engaged in a gear. Driver demand wheel torque may be characterized via the following equation:

$$DD_{wheel} = (DD_{eng} \cdot GR_{Trn} \cdot GR_{FD}) + DD_{isg} \cdot GR_{Trn} \cdot GR_{FD} + DD_{Rdu} \cdot GR_{Rdu}$$

where $DD_{wheel}$ is driver demand wheel torque as determined via accelerator pedal position, $DD_{eng}$ is driver demand engine torque, $GR_{Trn}$ is presently engaged transmission gear ratio, $GR_{FD}$ is the final drive gear ratio (e.g., axle ratio), $GR_{Rdu}$ is the gear ratio of the read drive unit, $DD_{isg}$ is the driver demand integrated starter/generator torque, and $DD_{Rdu}$ is driver demand torque for the rear drive unit. The sum of driver demand engine torque and driver demand integrated starter/generator torque is transmission input torque without modification. In one example, the engine controller determines transmission input torque without modification. Method 400 proceeds to 424 after determining transmission input torque without modification.

At 424, method 400 estimates transmission input torque. The driver demand engine torque and/or integrated starter/generator torque (if present) may be modified for transmission clutch slippage, instantaneous transmission torque limits, transmission hardware torque limits, and other transmission conditions so that the desired wheel torque may be provided. For example, if a transmission clutch has a low torque capacity in response to application force applied to the clutch, engine torque may be temporarily reduced to reduce the possibility of clutch degradation. The engine torque during these conditions plus torque of the integrated starter/generator may be referred to as transmission input torque with torque modification. In one example, the transmission input torque may be described via the following equation:

$$Tq_{Trn\_est} = Tq_{isg\_est} + Tq_{eng\_est}$$

where $Tq_{Trn\_est}$ is the transmission estimated input torque at an input shaft upstream of a transmission clutch, $Tq_{isg\_est}$ is the estimated ISG torque, and $Tq_{eng\_est}$ is estimated engine torque. Method 400 proceeds to 426 after determining the estimated transmission input torque.

At 426, method 400 estimates an equivalent transmission input torque. In one example, the equivalent transmission input torque may be determined via the following equation:

$$Tq_{Tm\_equ} = Tq_{Tm\_est} + \frac{(Tq_{Rdu\_est} - DD_{Rdu})GR_{Rdu}}{GR_{Tm} \cdot GR_{FD}}$$

where $Tq_{Tm\_equ}$ is the equivalent transmission input torque, $Tq_{Tm\_est}$ is the estimated transmission input torque and $Tq_{Rdu\_est}$ is the estimated rear drive unit torque. Note that a torque ratio and motor positioned directly behind the transmission or on an independently driven axle may be substituted for the rear drive unit. Method 400 proceeds to 428 after equivalent transmission input torque is estimated.

At 428, method 400 estimates a percentage of a requested driveline torque reduction that is to be provided via the engine, integrated starter/generator, the rear drive unit electric machine, and/or motor positioned directly downstream of the transmission or on an independent driven axle. Method 400 also determines engine torque reduction thresholds and battery power limits. In one example, method 400 includes an arbitrator function that selects percentages of inertia torque compensated by the engine, integrated starter/generator, and the rear drive unit electric machine. The arbitrator assigns percentages of inertia torque that is compensated by the engine, integrated starter/generator, and rear drive unit electric machine. For example, the engine may be assigned twenty percent of the inertia torque reduction, the integrated starter/generator may be assigned five percent of the inertia torque reduction, and the rear drive unit electric machine may be assigned seventy five percent of the inertia torque reduction. The arbitrator may determine the respective percentage inertia torque reductions in response to best fuel economy mode, best drivability mode, and best durability mode. In one example, a table of empirically determined rear drive unit torque reduction values is stored in controller memory. The table may be indexed via driver demand torque, battery power limits, rear drive unit electric machine thresholds, and vehicle drive mode. The table outputs a percentage value of compensation torque to be provided via the rear drive unit electric machine. Similar tables may be provided for the engine and the integrated starter/generator. Method 400 proceeds to 430.

At 430, method 400 commands the engine, rear drive unit electric machine, and integrated starter/generator. The engine, rear drive unit electric machine, and integrated starter/generator are commanded to provide the driver demand wheel torque and inertia torque compensation. The combined engine, integrated starter/generator, and rear drive unit electric machine may be commanded to the value of $Tq_{Trn\_max\_inst}$ or a lower torque value which includes inertia torque compensation. Method 400 proceeds to exit.

Figure 5:
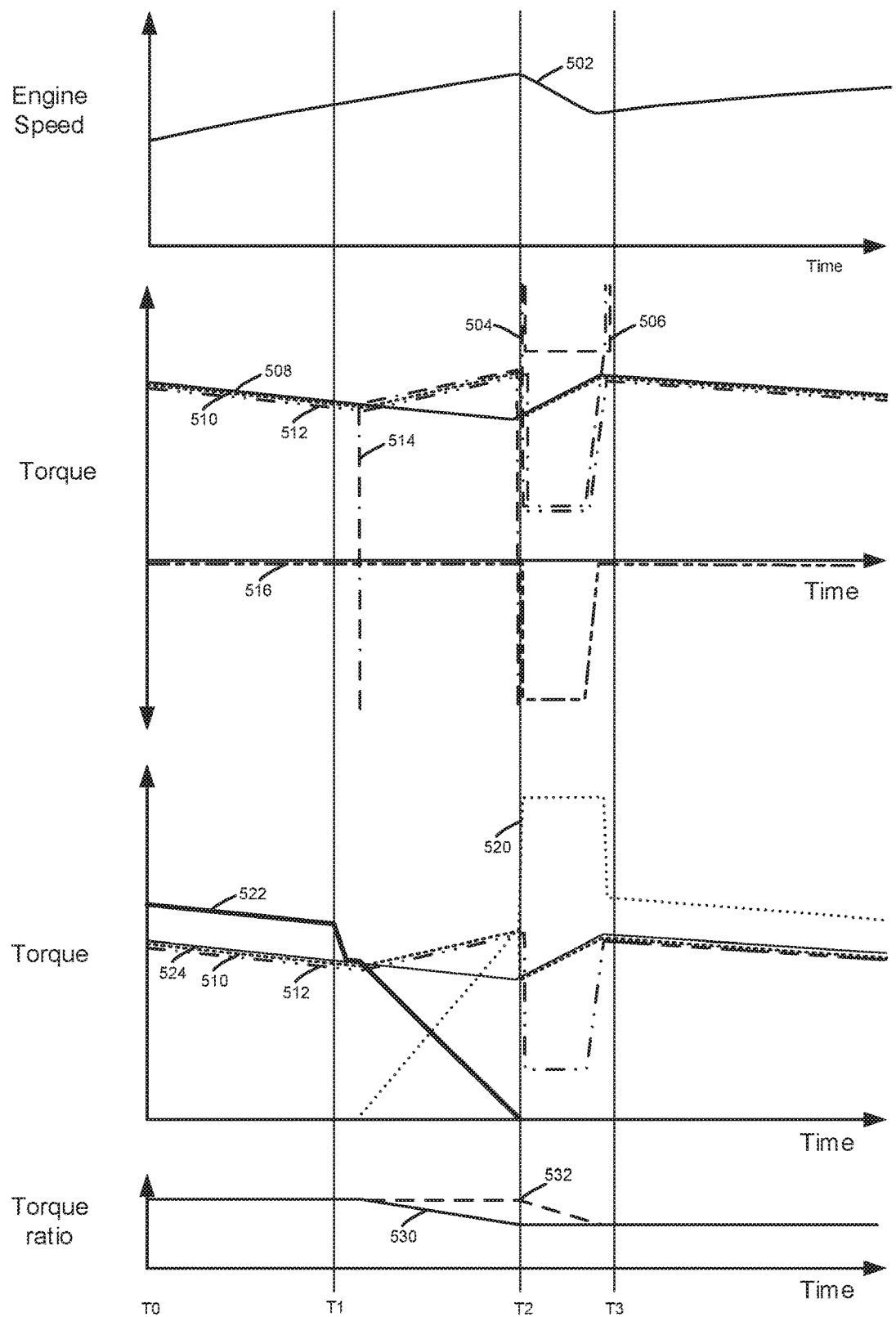
FIGS. 5-9 show plots of example transmission gear shifting according to the method of FIG. 4.

Referring now to FIG. 5, a prophetic example of a power-on upshift with rear drive unit electric machine inertia phase torque reduction is shown. The shifting sequence shown in FIG. 5 may be provided via the method of FIG. 4 in cooperation with the system shown in FIGS. 1A-3. The plots shown in FIG. 5 occur at the same time and are aligned in time. Engine torque compensation for inertia torque during the shift is not provided in the sequence of FIG. 5.

The first plot from the top of FIG. 5 is a plot of engine speed versus time. The vertical axis represents engine speed and engine speed increases in the direction of the vertical axis arrow. The horizontal axis represents time and time increases from the left side of the figure to the right side of the figure. Solid line 502 represents engine speed.

The second plot from the top of FIG. 5 is a plot of various transmission torque parameters versus time. The vertical axis represents torque and torque increases in the direction of the vertical axis up arrow. Torque below the horizontal axis is negative torque and magnitude of negative torque increases in a direction of the vertical axis down arrow. The horizontal axis represents time and time increases from the left side of the figure to the right side of the figure. Dash-dot line 504 represents transmission maximum instantaneous torque limit or instantaneous transmission input torque upper threshold not to be exceeded. Dashed line 506 represents transmission maximum hardware torque limit or transmission hardware threshold not to be exceeded torque. Solid line 508 represents driver demand torque (e.g., torque requested via a human or autonomous vehicle driver). Small dashed line 510 represents transmission input torque. Dash-dot-dot line 512 represents equivalent transmission input torque (e.g., engine torque and integrated starter/generator torque plus rear drive unit electric machine compensation torque). Dash-dash-dot line 514 represents transmission minimum instantaneous input torque limit or a transmission input torque lower threshold, which transmission input torque is not to be less than. Dash-small dash-small dash line 516 represents rear drive unit motor torque reflected or observed at the transmission input (e.g., clutch housing 393 shown in FIG. 3).

The third plot from the top of FIG. 5 is a plot of various additional transmission torque parameters versus time. The vertical axis represents torque and torque increases in the direction of the vertical axis up arrow. Torque below the horizontal axis is negative torque and magnitude of negative torque increases in a direction of the vertical axis down arrow. The horizontal axis represents time and time increases from the left side of the figure to the right side of the figure. Dotted line 520 represents torque capacity of the transmission's second input clutch (e.g., 127 of FIG. 3). Solid line 522 represents torque capacity of the transmission's first input clutch (e.g., 126 of FIG. 3). Solid line 524 represents transmission input torque without torque modification (e.g., transmission input torque including adjustments for transmission torque thresholds and clutch slip). Dashed line 510 represents transmission input torque. Dash-dot-dot line 512 represents equivalent transmission input torque.

The fourth plot from the top of FIG. 5 is a plot of transmission torque ratio versus time. The vertical axis represents transmission torque ratio and transmission torque ratio increases in the direction of the vertical axis arrow. The horizontal axis represents time and time increases from the left side of the figure to the right side of the figure. Solid line 530 represents actual transmission torque ratio (e.g., ratio of transmission input torque to transmission output torque). Dashed line 532 represents reported transmission torque ratio (e.g., ratio of transmission input torque to transmission output torque as determined from transmission input speed to transmission output speed). Solid line 530 and dashed line 532 are equivalent when only solid line 530 is visible.

The horizontal axis of each plot corresponds to a value of zero for the vertical axis unless otherwise noted. Further, the vertical axis of each plot corresponds to a value of zero time. In addition, torque values above horizontal axes are adding positive torque.

At time T0, the engine speed is increasing and the driver demand torque is a middle level. The transmission input torque 510 and the equivalent transmission input torque 512 are substantially equal to the driver demand torque (e.g., within 3% of each other). The driver demand torque trace 508, transmission input torque trace 510, and equivalent transmission input torque trace 512 are shown slightly separated to improve trace visibility. The torque capacity of the transmission's first input clutch is at a higher level and the transmission input torque with modification is at a higher level. The torque capacity of the transmission's second input clutch is zero. The transmission torque ratio is a higher value reflecting that a lower gear is engaged (e.g., $1^{st}$ gear), which provides a higher torque ratio.

At time T1, a power-on upshift begins and the transmission gear shift enters a torque transfer phase. The torque capacity of the transmission's first input clutch 522 (e.g., off-going clutch) starts to be reduced. Shortly thereafter, the transmission minimum instantaneous input torque limit 514 is increased. The transmission input torque 510 and the equivalent transmission torque 512 are increased to follow the transmission minimum instantaneous input torque limit. The driver demand torque continues on its present trajectory.

Between time T1 and time T2, the torque capacity of the transmission's second input clutch 520 (e.g., on-coming clutch) begins to increase shortly after the torque capacity of the transmission's first input clutch 522 begins to be reduced. The transmission's actual torque ratio 530 begins to be reduced and the reported transmission torque ratio 532 remains constant. The transmission's first input clutch torque capacity 522 continues to decrease as the first input clutch is opened. The transmission's second input clutch torque capacity 520 continues to increase as the second input clutch is closed. The engine speed 502 continues to increase and the transmission minimum torque limit 514 is reduced shortly before time T2.

At time T2, the torque transfer phase of the power-on upshift ends and the inertia phase of the power-on upshift begins. The torque transfer phase ends when the torque capacity of the transmission's first input clutch is zero or substantially zero (e.g., less than 5 Nm). Shortly after the inertia phase begins, the torque capacity of the transmission's second input clutch 520 is increased, and then the transmission maximum instantaneous torque limit 504 is reduced to counteract the inertia torque added to the system. The transmission hardware torque limit 506 is also reduced to protect transmission components. A magnitude of negative torque produced by the torque of the rear drive unit 516 is increased to counteract the inertia torque added to the system. In this way, the transmission output torque is maintained to prove consistent vehicle acceleration while the desired ratio change profile is executed. The transmission input torque 510 is reduced to a level of the driver demand torque 508 and the equivalent transmission input torque 512 is reduced to a level of the transmission maximum instantaneous torque limit 504 (a small gap between the traces is used to improve observability). The driver demand torque begins to increase after entering the inertia phase of the transmission gear shift.

Between time T2 and time T3, the rear drive unit torque reflected at the transmission input decreases to compensate for the torque added to the system during the inertia phase of the transmission gear shift, and then it increases near the end of the inertia phase of the transmission gear shift. The magnitude of the rear drive unit torque reflected at the transmission input shaft is maintained at a larger level, then it is decreased near time T3. The engine speed 502 decreases toward a transmission input clutch housing speed (not show). The transmission maximum instantaneous torque limit 504 is decreased and then increases near time T3. Likewise, the transmission maximum hardware torque limit 506 is decreased and then increases near time T3. The driver demand torque 508 and the transmission input torque 510 increase. The equivalent transmission input torque 512 decreases and then increases near time T3. The transmission's second clutch torque capacity 520 is decreased after it was increased. The reported transmission torque ratio 532 is reduced to a level of the actual transmission torque ratio 530.

At time T3, the shift completes and the engine speed continues to accelerate. The driver demand torque 508, transmission input torque 510, and equivalent transmission torque 512 are substantially the same. The rear drive unit electric machine torque reflected to the transmission input 516 is zero.

In this way, inertia torque during the inertia phase of a power-on upshift may be compensated via a rear drive unit electric machine torque. By compensating the inertia torque, it may be possible to reduce driveline torque disturbances. Further, the rear drive unit electric machine torque may maintain smooth vehicle acceleration during the gear shift.

Figure 6:
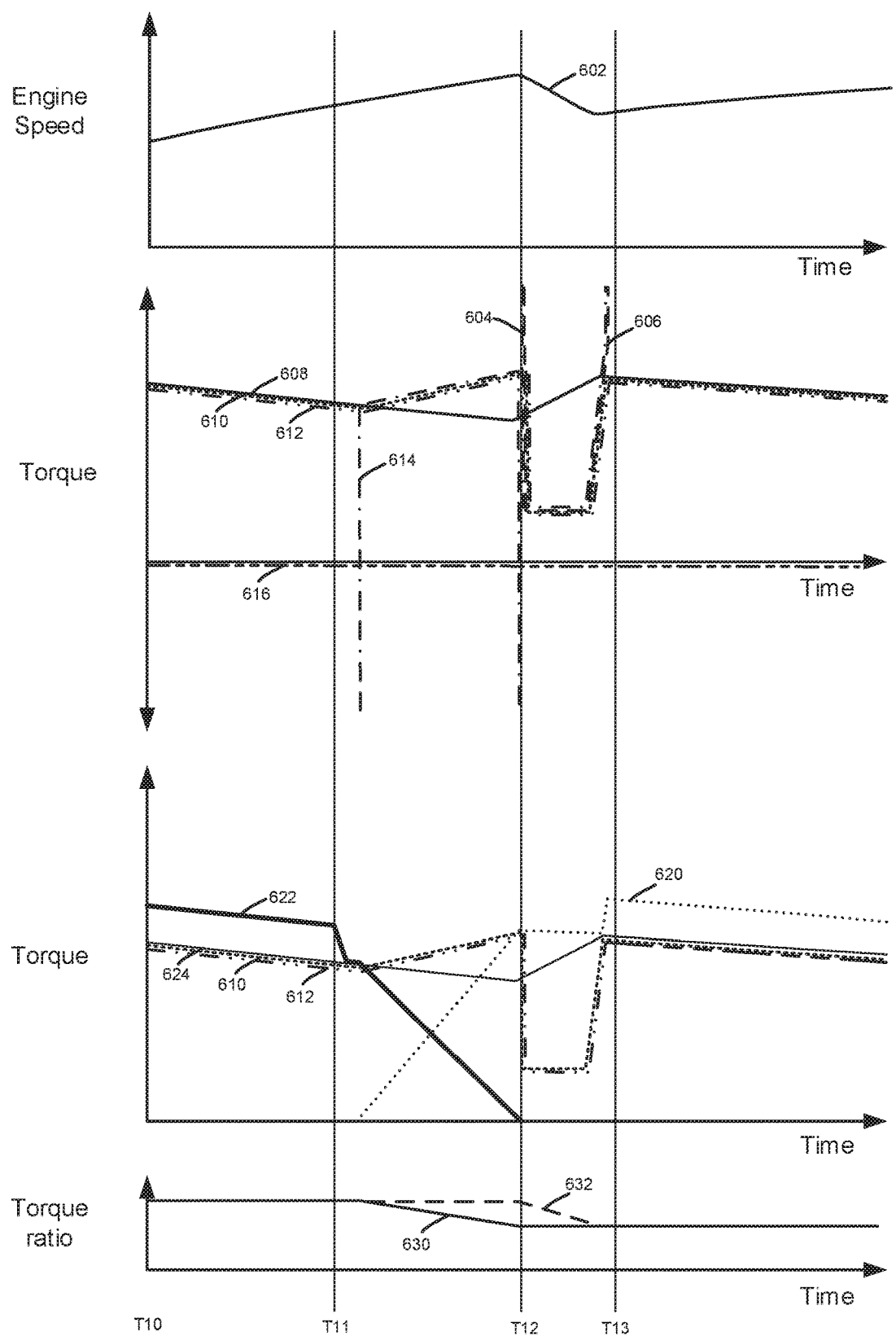

Referring now to FIG. 6, a prophetic example of a power-on upshift with input actuator (e.g., engine and/or integrated starter/generator) torque compensation is shown. The shifting sequence shown in FIG. 6 may be provided via the method of FIG. 4 in cooperation with the system shown in FIGS. 1A-3. The plots shown in FIG. 6 occur at the same time and are aligned in time. In addition, the gear shift sequence of FIG. 6 is performed with at the same vehicle speed and driver demand torque as the shift shown in FIG. 5. Further, the gear ratio change in FIG. 6 is the same as the gear ratio change in FIG. 5.

The first plot from the top of FIG. 6 is a plot of engine speed versus time. The vertical axis represents engine speed and engine speed increases in the direction of the vertical axis arrow. The horizontal axis represents time and time increases from the left side of the figure to the right side of the figure. Solid line 602 represents engine speed.

The second plot from the top of FIG. 6 is a plot of various transmission torque parameters versus time. The vertical axis represents torque and torque increases in the direction of the vertical axis up arrow. Torque below the horizontal axis is negative torque and magnitude of negative torque increases in a direction of the vertical axis down arrow. The horizontal axis represents time and time increases from the left side of the figure to the right side of the figure. Dash-dot line 604 represents transmission maximum instantaneous torque limit or instantaneous transmission input torque upper threshold not to be exceeded. Dashed line 606 represents transmission maximum hardware torque limit or transmission hardware threshold not to be exceeded torque. Solid line 608 represents driver demand torque (e.g., torque requested via a human or autonomous vehicle driver). Dashed line 610 represents transmission input torque. Dash-dot-dot line 612 represents equivalent transmission input torque (e.g., engine torque and integrated starter/generator torque plus rear drive unit electric machine compensation torque). Dash-dash-dot line 614 represents transmission minimum instantaneous input torque limit or transmission input torque lower threshold, which transmission input torque is not to be less than. Dash-small dash-small dash line 616 represents rear drive unit motor torque reflected or observed at the transmission input (e.g., clutch housing 393 shown in FIG. 3).

The third plot from the top of FIG. 6 is a plot of various additional transmission torque parameters versus time. The vertical axis represents torque and torque increases in the direction of the vertical axis up arrow. Torque below the horizontal axis is negative torque and magnitude of negative torque increases in a direction of the vertical axis down arrow. The horizontal axis represents time and time increases from the left side of the figure to the right side of the figure. Dotted line 620 represents torque capacity of the transmission's second input clutch (e.g., 127 of FIG. 3). Solid line 622 represents torque capacity of the transmission's first input clutch (e.g., 126 of FIG. 3). Solid line 624 represents transmission input torque without torque modification (e.g., transmission input torque including adjustments for transmission torque thresholds and clutch slip). Dashed line 610 represents transmission input torque. Dash-dot-dot line 612 represents equivalent transmission input torque.

The fourth plot from the top of FIG. 6 is a plot of transmission torque ratio versus time. The vertical axis represents transmission torque ratio and transmission torque ratio increases in the direction of the vertical axis arrow. The horizontal axis represents time and time increases from the left side of the figure to the right side of the figure. Solid line 630 represents actual transmission torque ratio (e.g., ratio of transmission input torque to transmission output torque). Dashed line 632 represents reported transmission torque ratio (e.g., ratio of transmission input torque to transmission output torque as determined from transmission input speed to transmission output speed). Solid line 630 and dashed line 632 are equivalent when only solid line 630 is visible.

The horizontal axis of each plot corresponds to a value of zero for the vertical axis unless otherwise noted. Further, the vertical axis of each plot corresponds to a value of zero time.

At time T10, the engine speed 602 is increasing and the driver demand torque 608 is a middle level. The transmission input torque 610 and the equivalent transmission input torque 612 are substantially equal to the driver demand torque 608 (e.g., within 3% of each other). The driver demand torque trace 608, transmission input torque trace 610, and equivalent transmission input torque trace 612 are shown slightly separated to improve trace visibility. The torque capacity of the transmission's first input clutch 622 is at a higher level and the transmission input torque with modification 624 is at a higher level. The torque capacity of the transmission's second input clutch 620 is zero. The transmission torque ratio 630 is a higher value reflecting that a lower gear is engaged (e.g., $1^{st}$ gear), which provides a higher torque ratio.

At time T11, a power-on upshift begins and the transmission gear shift enters a torque transfer phase. The torque capacity of the transmission's first input clutch 622 (e.g., off-going clutch) starts to be reduced. Shortly thereafter, the transmission minimum instantaneous input torque limit 614 is increased. The transmission input torque 610 and the equivalent transmission torque 612 are increased to follow the transmission minimum instantaneous input torque limit 614. The driver demand torque 608 continues on its present trajectory.

Between time T11 and time T12, the torque capacity of the transmission's second input clutch 620 (e.g., on-coming clutch) begins to increase shortly after the torque capacity of the transmission's first input clutch 622 begins to be reduced. The transmission's actual torque ratio 630 begins to be reduced and the reported transmission torque ratio remains constant. The transmission's first input clutch torque capacity 622 continues to decrease as the first input clutch is opened. The transmission's second input clutch torque capacity 620 continues to increase as the second input clutch is closed. The engine speed 602 continues to increase and the transmission minimum torque limit is reduced shortly before time T12.

At time T12, the torque transfer phase of the power-on upshift ends and the inertia phase of the power-on upshift begins. The torque transfer phase ends when the torque capacity of the transmission's first input clutch is zero or substantially zero (e.g., less than 5 Nm). Shortly after the inertia phase begins, the torque capacity of the transmission's second input clutch 620 is decreased, and then the transmission maximum instantaneous torque limit 604 is reduced to counteract the inertia torque added to the system. The transmission hardware torque limit 606 is also reduced to protect transmission components. Because these limits are equal, the requested torque reduction must be achieved via the transmission assembly input actuators (engine and/or ISG). The input torque to the transmission input 610 (e.g., clutch housing 393) is reduced via reducing engine torque by retarding spark and/or reducing engine air flow to counteract the inertia torque added to the system. The rear drive unit electric machine torque reflected to the transmission input 616 is zero. In this way, the transmission output torque is maintained to prove consistent vehicle acceleration while the desired ratio change profile is executed. The transmission input torque and the transmission equivalent input torque are reduced to a level of the transmission maximum instantaneous torque limit (a small gap between the traces is used to improve observability). The driver demand torque begins to increase after entering the inertia phase of the transmission gear shift. Transmission clutch torque capacity and rear drive unit torque determine torque produced at the vehicle's wheels. The transmission clutch capacity is determined to provide constant vehicle acceleration with the rear drive unit torque compensation output. The difference between transmission clutch torque capacity and transmission input torque determines the rate of change in engine speed.

Between time T12 and time T13, the rear drive unit torque reflected at the transmission input 616 remains at zero so that rear drive unit electric machine torque compensation for inertia torque is not provided. The transmission maximum instantaneous torque limit 604 is decreased and then increases near time T13. Likewise, the transmission maximum hardware torque limit 606 is decreased and then it increases near time T13. The driver demand torque 608 increases and the transmission input shaft torque 620 is at a level of the transmission instantaneous torque limit 604 until just before time T13 where it returns to the driver demand torque (trace spacing provided to increase observability). The equivalent transmission input torque 612 is at a level of the transmission instantaneous torque limit 604 until just before time T13 where it is returned to the driver demand torque 608. The transmission's second clutch torque capacity 620 is increased near time T13 and the reported transmission torque ratio 632 is reduced to a level of the actual transmission torque ratio 630. The transmission input torque with modification 624 increases.

At time T13, the shift completes and the engine speed continues to accelerate. The driver demand torque, transmission input torque, and equivalent transmission torque are substantially the same. The rear drive unit electric machine torque reflected to the transmission input is zero. In this way, inertia torque during the inertia phase of a power-on upshift may be compensated via reducing transmission input torque at the transmission clutch housing. The transmission input torque 610 may be reduced via retarding engine spark timing or reducing engine air flow. By compensating the inertia torque, it may be possible to reduce driveline torque disturbances.

The shifting sequence of FIG. 5 is compared to the shifting sequence of FIG. 6, the shifting sequence of FIG. 5 may have reduced losses and higher efficiency. Further, the on-coming clutch profiles are the same in FIGS. 5 and 6, but torque transferred via the on-coming clutch is greater in the sequence of FIG. 5.

Figure 7:
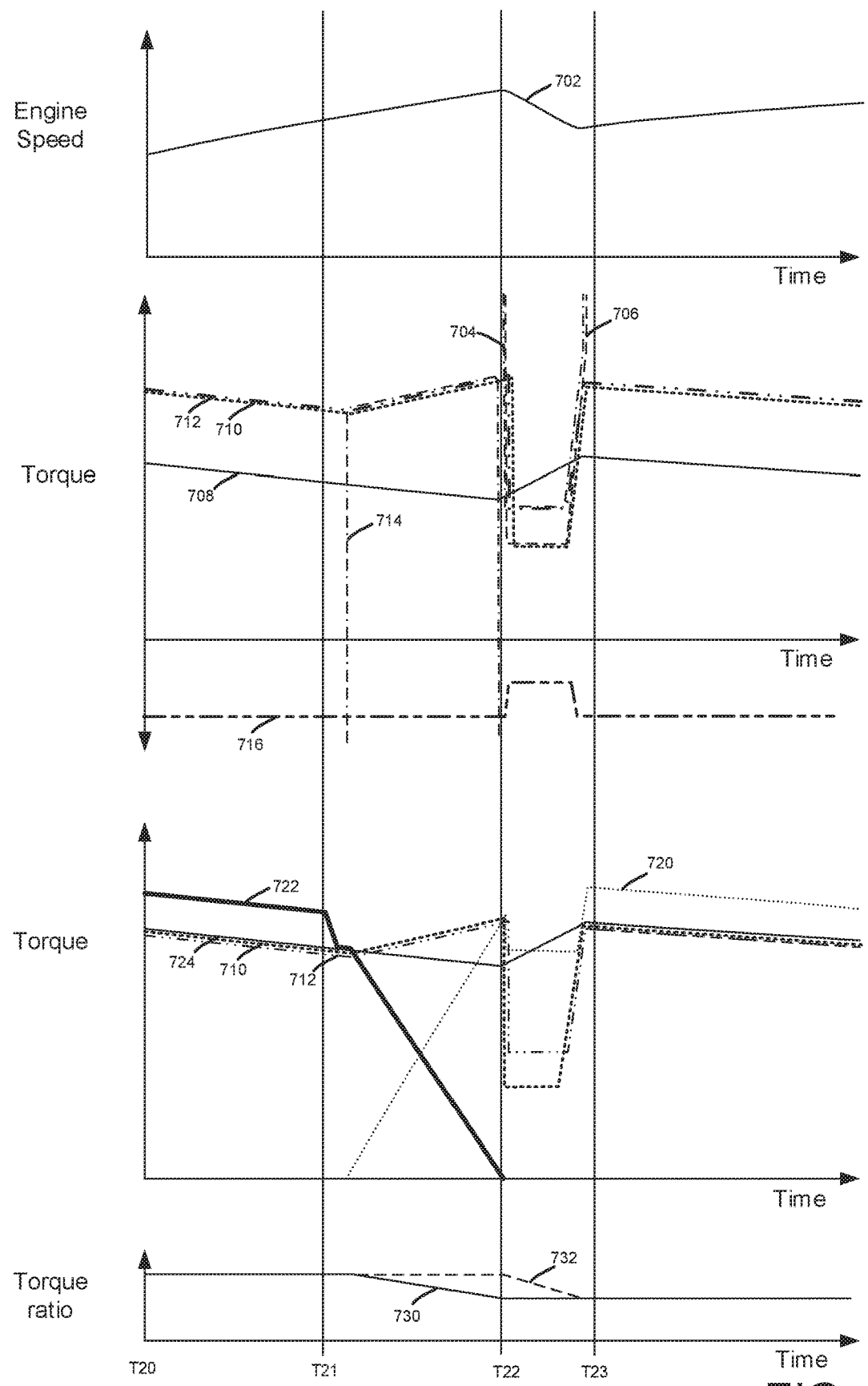

Referring now to FIG. 7, a prophetic example of a power-on upshift is shown with rear drive unit electric machine torque compensation when the rear drive unit electric machine is charging a battery or electric energy storage device. The shifting sequence shown in FIG. 7 may be provided via the method of FIG. 4 in cooperation with the system shown in FIGS. 1A-3. The plots shown in FIG. 7 occur at the same time and are aligned in time. In addition, the gear shift sequence of FIG. 7 is performed with at the same vehicle speed and driver demand torque as the shift shown in FIG. 5 except the rear drive unit is charging the vehicle high voltage battery. Further, the gear ratio change in FIG. 7 is the same as the gear ratio change in FIG. 5.

In this example, the maximum transmission protection limit is less than the maximum torque coordination limit. The transmission assembly input torque is reduced to the maximum transmission protection limit 704. The rear drive unit electric machine fills in the torque difference to achieve the desired wheel torque profile and the oncoming clutch capacity is reduced to ensure a consistent ratio change profile.

The first plot from the top of FIG. 7 is a plot of engine speed versus time. The vertical axis represents engine speed and engine speed increases in the direction of the vertical axis arrow. The horizontal axis represents time and time increases from the left side of the figure to the right side of the figure. Solid line 702 represents engine speed.

The second plot from the top of FIG. 7 is a plot of various transmission torque parameters versus time. The vertical axis represents torque and torque increases in the direction of the vertical axis up arrow. Torque below the horizontal axis is negative torque and magnitude of negative torque increases in a direction of the vertical axis down arrow. The horizontal axis represents time and time increases from the left side of the figure to the right side of the figure. Dash-dot line 704 represents transmission maximum instantaneous torque limit or instantaneous transmission input torque not to be exceeded. Dashed line 706 represents transmission maximum hardware torque limit or transmission hardware not to be exceeded torque. Solid line 708 represents driver demand torque (e.g., torque requested via a human or autonomous vehicle driver). Dashed line 710 represents transmission input torque. Dash-dot-dot line 712 represents equivalent transmission input torque. Dash-dash-dot line 714 represents transmission minimum instantaneous input torque limit or transmission input torque lower threshold, which transmission input torque is not to be less than. Dash-small dash-small dash line 716 represents rear drive unit motor torque reflected or observed at the transmission input (e.g., clutch housing 393 shown in FIG. 3).

The third plot from the top of FIG. 7 is a plot of various additional transmission torque parameters versus time. The vertical axis represents torque and torque increases in the direction of the vertical axis arrow up. Torque below the horizontal axis is negative torque and magnitude of negative torque increases in a direction of the vertical axis down arrow. The horizontal axis represents time and time increases from the left side of the figure to the right side of the figure. Dotted line 720 represents torque capacity of the transmission's second input clutch (e.g., 127 of FIG. 3). Solid line 722 represents torque capacity of the transmission's first input clutch (e.g., 126 of FIG. 3). Solid line 724 represents transmission input torque without torque modification. Dash-dot line 710 represents transmission input torque. Dash-dot-dot line 712 represents equivalent transmission input torque.

The fourth plot from the top of FIG. 7 is a plot of transmission torque ratio versus time. The vertical axis represents transmission torque ratio and transmission torque ratio increases in the direction of the vertical axis arrow. The horizontal axis represents time and time increases from the left side of the figure to the right side of the figure. Solid line 730 represents actual transmission torque ratio (e.g., ratio of transmission input torque to transmission output torque). Dashed line 732 represents reported transmission torque ratio (e.g., ratio of transmission input torque to transmission output torque as determined from transmission input speed to transmission output speed). Solid line 730 and dashed line 732 are equivalent when only solid line 730 is visible.

The horizontal axis of each plot corresponds to a value of zero for the vertical axis unless otherwise noted. Further, the vertical axis of each plot corresponds to a value of zero time.

At time T20, the engine speed 720 is increasing and the driver demand torque 708 is a middle level. The transmission input torque 710 and the equivalent transmission input torque 712 are substantially equal and the driver demand torque 708 is less than the transmission input torque 710 and the equivalent transmission input torque 712. The transmission input torque trace 710 and equivalent transmission input torque trace 712 are shown slightly separated to improve trace visibility. The driver demand torque 708 is less than the transmission input torque 710 because engine torque is being input to the transmission and converted to electrical energy at the rear drive unit electric machine. The difference between the transmission input torque 710 and the driver demand torque 708 is engine torque that is converted to electric charge. The torque capacity of the transmission's first input clutch 722 is at a higher level and the transmission input torque with modification 724 is at a higher level. The torque capacity of the transmission's second input clutch 720 is zero. The transmission torque ratio 730 is a higher value reflecting that a lower gear is engaged (e.g., $1^{st}$ gear), which provides a higher torque ratio.

At time T21, a power-on upshift begins and the transmission gear shift enters a torque transfer phase. The torque capacity of the transmission's first input clutch 722 (e.g., off-going clutch) starts to be reduced. Shortly thereafter, the transmission minimum instantaneous input torque limit 714 is increased. The transmission input torque 710 and the equivalent transmission torque 712 are increased to follow the transmission minimum instantaneous input torque limit 714. The driver demand torque 708 continues on its present trajectory.

Between time T21 and time T22, the torque capacity of the transmission's second input clutch 720 (e.g., on-coming clutch) begins to increase shortly after the torque capacity of the transmission's first input clutch 722 begins to be reduced. The transmission's actual torque ratio 730 begins to be reduced and the reported transmission torque ratio 732 remains constant. The transmission's first input clutch torque capacity 722 continues to decrease as the first input clutch is opened. The transmission's second input clutch torque capacity 720 continues to increase as the second input clutch is closed. The engine speed 702 continues to increase and the transmission minimum torque limit 714 is reduced shortly before time T22.

At time T22, the torque transfer phase of the power-on upshift ends and the inertia phase of the power-on upshift begins. The torque transfer phase ends when the torque capacity of the transmission's first input clutch is zero or substantially zero (e.g., less than 5 Nm). Shortly after the inertia phase begins, the torque capacity of the transmission's second input clutch is decreased, and then the transmission maximum instantaneous torque limit 704 is reduced to counteract the inertia torque added to the system. The transmission hardware torque limit 706 is also reduced to protect transmission components and it has a value less than the maximum instantaneous torque limit 704. The input torque to the transmission input 710 is reduced via reducing engine torque by retarding spark and/or reducing engine air flow to counteract the inertia torque added to the system. The magnitude of the rear drive unit electric machine torque reflected to the transmission input 716 is reduced from a larger charging torque to a smaller charging torque. In this way, the reduction of engine torque may not be observed at the vehicle wheels since the rear drive unit electric machine charging torque is reduced, thereby offsetting the reduction of engine torque. The reduction of rear drive unit electric machine charging torque 716 lowers negative torque applied to the driveline. As such, vehicle acceleration may be maintained. The transmission input torque 710 is reduced to a level below the transmission maximum instantaneous torque limit 704 and the transmission equivalent input torque 712 is reduced to a level of the transmission maximum instantaneous torque limit 704 (a small gap between the traces is used to improve observability). The driver demand torque 708 begins to increase after entering the inertia phase of the transmission gear shift.

Between time T22 and time T23, the rear drive unit torque reflected at the transmission 716 is reduced to a lower charging torque so that rear drive unit electric machine torque compensation for inertia torque makes the equivalent transmission input torque 712 equal to the transmission maximum instantaneous torque limit 704. The transmission maximum instantaneous torque limit 704 is decreased and then increases near time T23. Likewise, the transmission maximum hardware torque limit 706 is decreased and then increases near time T23. The driver demand torque 708 increases and the transmission input shaft torque 710 is at a level of the transmission instantaneous torque limit 704 until just before time T23 where it returns to a level equal to the driver demand torque 708 plus the battery charging torque. The equivalent transmission input torque 712 is at a level of the transmission instantaneous torque limit 704 until just before time T23 where it is returned to the driver demand torque 708 plus charging torque. The transmission's second clutch torque capacity 720 is increased near time T23 and the reported transmission torque ratio 732 is reduced to a level of the actual transmission torque ratio 730. The transmission input torque with modification increases 724.

At time T23, the shift completes and the engine speed continues to accelerate. The driver demand torque 708, transmission input torque 710, and equivalent transmission torque 712 are substantially the same. The rear drive unit electric machine torque reflected to the transmission input 716 is returned to its value before the transmission gear shift, which is equal to the charging torque.

In this way, inertia torque during the inertia phase of a power-on upshift may be compensated via reducing transmission input torque at the transmission clutch housing. The transmission input torque may be reduced via reducing rear drive unit electric machine charging torque. By compensating the inertia torque, it may be possible to reduce driveline torque disturbances.

Figure 8:
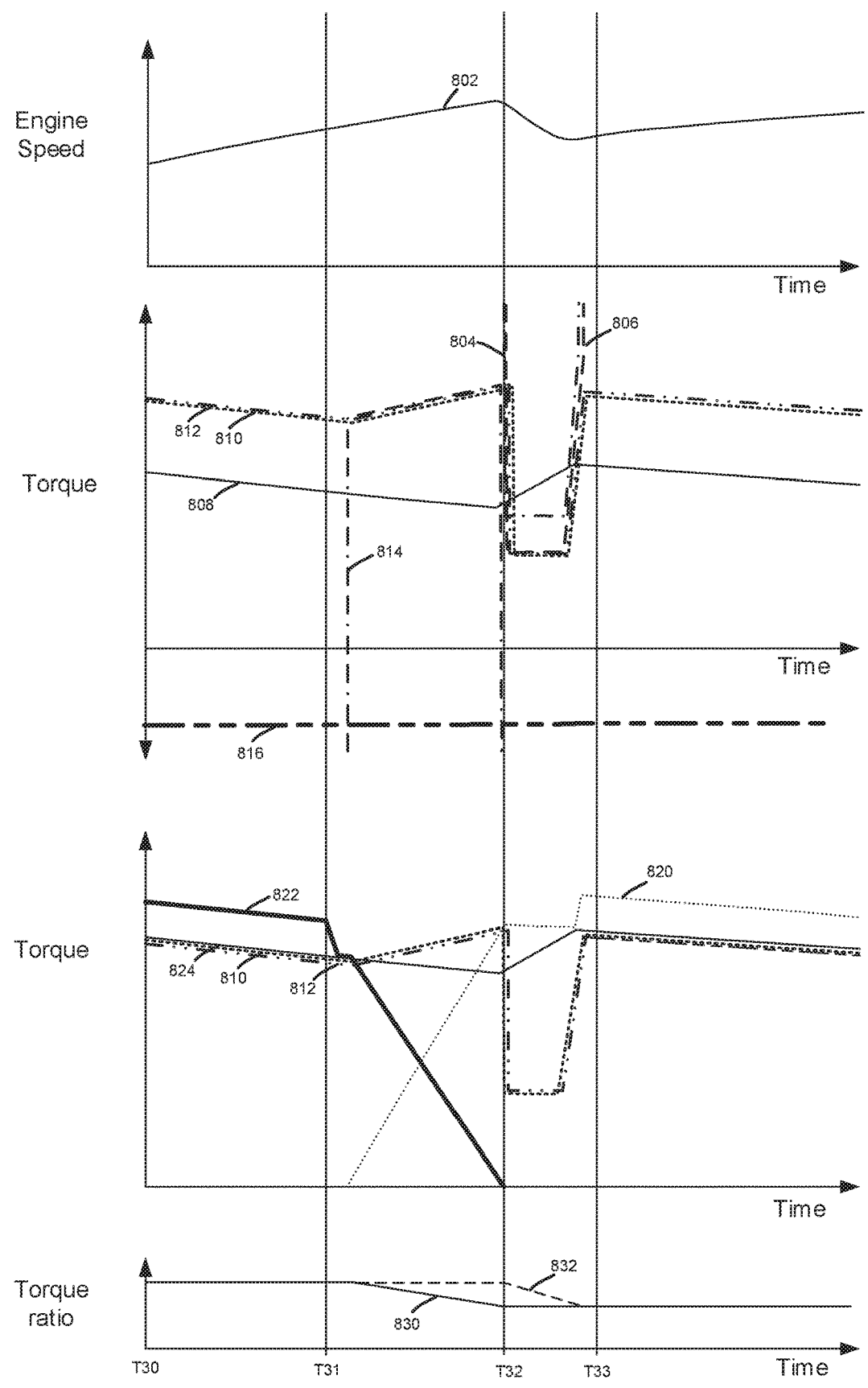

Referring now to FIG. 8, a prophetic example of a power-on upshift is shown with rear drive unit electric machine torque compensation when the rear drive unit electric machine is charging a battery or electric energy storage device. The shifting sequence shown in FIG. 8 may be provided via the method of FIG. 4 in cooperation with the system shown in FIGS. 1A-3. The plots shown in FIG. 8 occur at the same time and are aligned in time. In addition, the gear shift sequence of FIG. 8 is performed with at the same vehicle speed and driver demand torque as the shift shown in FIG. 5. Further, the gear ratio change in FIG. 8 is the same as the gear ratio change in FIG. 5.

During some conditions, the rear drive unit electric machine may not be able to provide the transmission torque modification. Whenever the equivalent transmission assembly input torque is different from the maximum transmission torque coordination limit, the desired torque may be delivered by decreasing the desired gear ratio change duration. The sequence of FIG. 8 illustrates an example where the electric machine cannot provide the torque modification. The sequence of FIG. 8 is the same as shown in FIG. 7, but the rear drive unit electric machine torque is held constant through the shift. The transmission controller executes the gear ratio change in a shorter amount of time, but the actual wheel torque profile is identical between the two cases.

The first plot from the top of FIG. 8 is a plot of engine speed versus time. The vertical axis represents engine speed and engine speed increases in the direction of the vertical axis arrow. The horizontal axis represents time and time increases from the left side of the figure to the right side of the figure. Solid line 802 represents engine speed.

The second plot from the top of FIG. 8 is a plot of various transmission torque parameters versus time. The vertical axis represents torque and torque increases in the direction of the vertical axis arrow up. Torque below the horizontal axis is negative torque and magnitude of negative torque increases in a direction of the vertical axis down arrow. The horizontal axis represents time and time increases from the left side of the figure to the right side of the figure. Dash-dot line 804 represents transmission maximum instantaneous torque limit or instantaneous transmission input torque not to be exceeded. Dashed line 806 represents transmission maximum hardware torque limit or transmission hardware not to be exceeded torque. Solid line 808 represents driver demand torque (e.g., torque requested via a human or autonomous vehicle driver). Dashed line 810 represents transmission input torque. Dash-dot-dot line 812 represents equivalent transmission input torque. Dash-dash-dot line 814 represents transmission minimum instantaneous input torque limit or transmission input torque lower threshold, which transmission input torque is not to be less than. Large dash-small dash-small dash line 816 represents rear drive unit motor torque reflected or observed at the transmission input.

The third plot from the top of FIG. 8 is a plot of various additional transmission torque parameters versus time. The vertical axis represents torque and torque increases in the direction of the vertical axis up arrow. Torque below the horizontal axis is negative torque and magnitude of negative torque increases in a direction of the vertical axis down arrow. The horizontal axis represents time and time increases from the left side of the figure to the right side of the figure. Dotted line 820 represents torque capacity of the transmission's second input clutch (e.g., 127 of FIG. 3). Solid line 822 represents torque capacity of the transmission's first input clutch (e.g., 126 of FIG. 3). Solid line 824 represents transmission input torque without torque modification. Dashed line 810 represents transmission input torque. Dash-dot-dot line 812 represents equivalent transmission input torque.

The fourth plot from the top of FIG. 8 is a plot of transmission torque ratio versus time. The vertical axis represents transmission torque ratio and transmission torque ratio increases in the direction of the vertical axis arrow. The horizontal axis represents time and time increases from the left side of the figure to the right side of the figure. Solid line 830 represents actual transmission torque ratio (e.g., ratio of transmission input torque to transmission output torque). Dashed line 832 represents reported transmission torque ratio (e.g., ratio of transmission input torque to transmission output torque as determined from transmission input speed to transmission output speed). Solid line 830 and dashed line 832 are equivalent when only solid line 830 is visible.

The horizontal axis of each plot corresponds to a value of zero for the vertical axis unless otherwise noted. Further, the vertical axis of each plot corresponds to a value of zero time.

At time T30, the engine speed 802 is increasing and the driver demand torque 808 is a middle level. The transmission input torque 810 and the equivalent transmission input torque 812 are substantially equal, and the driver demand torque 808 is less than the transmission input torque 810 and the equivalent transmission input torque 812. The transmission input torque trace 810 and equivalent transmission input torque trace 812 are shown slightly separated to improve trace visibility. The driver demand torque 808 is less than the transmission input torque 810 because engine torque is being input to the transmission and converted to electrical energy at the rear drive unit electric machine. The difference between the transmission input torque 810 and the driver demand torque 808 is engine torque that is converted to electric charge. The torque capacity of the transmission's first input clutch 822 is at a higher level and the transmission input torque with modification 824 is at a higher level. The torque capacity of the transmission's second input clutch 820 is zero. The transmission torque ratio 830 is a higher value reflecting that a lower gear is engaged (e.g., 1$^{st}$ gear), which provides a higher torque ratio.

At time T31, a power-on upshift begins and the transmission gear shift enters a torque transfer phase. The torque capacity of the transmission's first input clutch 822 (e.g., off-going clutch) starts to be reduced. Shortly thereafter, the transmission minimum instantaneous input torque limit 814 is increased. The transmission input torque 810 and the equivalent transmission torque 812 are increased to follow the transmission minimum instantaneous input torque limit 814. The driver demand torque 808 continues on its present trajectory.

Between time T31 and time T32, the torque capacity of the transmission's second input clutch 820 (e.g., on-coming clutch) begins to increase shortly after the torque capacity of the transmission's first input clutch 822 begins to be reduced. The transmission's actual torque ratio 830 begins to be reduced and the reported transmission torque ratio 832 remains constant. The transmission's first input clutch torque capacity 822 continues to decrease as the first input clutch is opened. The transmission's second input clutch torque capacity 820 continues to increase as the second input clutch is closed. The engine speed 802 continues to increase and the transmission minimum instantaneous torque limit 814 is reduced shortly before time T32.

At time T32, the torque transfer phase of the power-on upshift ends and the inertia phase of the power-on upshift begins. The torque transfer phase ends when the torque capacity of the transmission's first input clutch is zero or substantially zero (e.g., less than 5 Nm). Shortly after the inertia phase begins, the torque capacity of the transmission's second input clutch 820 begins to decrease slightly, and then the transmission maximum instantaneous torque limit 804 is reduced to counteract the inertia torque added to the system. The transmission hardware torque limit 806 is also reduced to protect transmission components and it has a value less than the maximum instantaneous torque limit 704. The input torque to the transmission input 810 is reduced via reducing engine torque by retarding spark and/or reducing engine air flow to counteract the inertia torque added to the system. The rear drive unit electric machine torque reflected to the transmission input 816 is held constant. In this way, the transmission output torque is maintained to prove consistent vehicle acceleration while the ratio change profile is executed. However, the duration of the gear ratio change phase is shortened. The transmission input torque 810 and the transmission equivalent input torque 812 are reduced to a level below the transmission maximum hardware torque limit 804 (a small gap between the traces is used to improve observability). The transmission maximum instantaneous torque limit 804 is reduced to a level that is greater than the transmission maximum hardware torque limit 806. The driver demand torque 808 begins to increase after entering the inertia phase of the transmission gear shift.

Between time T32 and time T33, the rear drive unit torque reflected at the transmission 816 is held constant so that battery charging continues uninterrupted. The transmission maximum instantaneous torque limit 804 is decreased and then increases near time T33. Likewise, the transmission maximum hardware torque limit 806 is decreased and then increases near time T33. The transmission maximum hardware torque limit 806 is reduced to a level less than the transmission instantaneous torque limit 804. The driver demand torque 808 increases and the transmission input shaft torque 810 is at a level of the transmission hardware torque limit 806 until just before time T33 where it returns to a level equal to the driver demand torque plus the battery charging torque. The equivalent transmission input torque 812 is also at a level of the transmission maximum hardware torque limit 804 until just before time T33 where it is returned to the driver demand torque 808 plus charging torque. The transmission's second clutch torque capacity 820 is increased near time T33 and the reported transmission torque ratio 832 is reduced to a level of the actual transmission torque ratio 830. The transmission input torque with modification increases 824.

At time T33, the shift completes and the engine speed 802 continues to accelerate. The driver demand torque 808, transmission input torque 810, and equivalent transmission torque 812 are substantially the same. The rear drive unit electric machine torque reflected to the transmission input 816 is returned to its value before the transmission gear shift, which is equal to the charging torque.

In this way, inertia torque during the inertia phase of a power-on upshift may be compensated via reducing transmission input torque at the transmission clutch housing. The transmission input torque may be reduced via reducing engine and/or integrated starter/generator torque. By compensating the inertia torque, it may be possible to reduce driveline torque disturbances.

Figure 9:
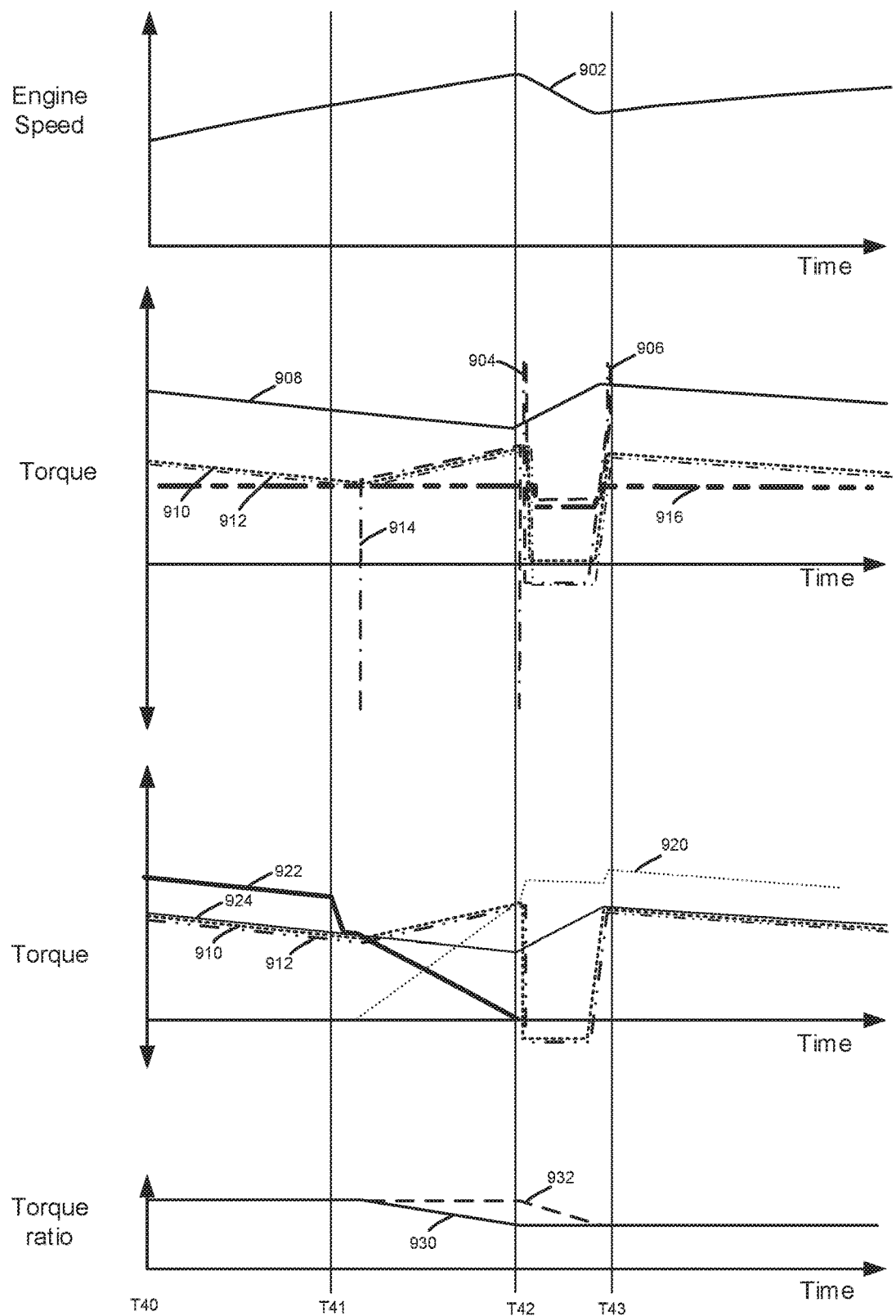

Referring now to FIG. 9, a prophetic example of a power-on upshift is shown with rear drive unit electric machine torque compensation when the rear drive unit electric machine is charging a battery or electric energy storage device. The shifting sequence shown in FIG. 9 may be provided via the method of FIG. 4 in cooperation with the system shown in FIGS. 1A-3. The plots shown in FIG. 9 occur at the same time and are aligned in time. In addition, the gear shift sequence of FIG. 9 is performed with at the same vehicle speed and driver demand torque as the shift shown in FIG. 5. Further, the gear ratio change in FIG. 9 is the same as the gear ratio change in FIG. 5.

The sequence of FIG. 9 illustrates the system response to the same pedal demand shown in FIG. 8 when the system is discharging via the rear drive unit electric machine (e.g., positive torque is provided to the driveline via the rear drive unit. The engine may not be capable of reducing transmission input torque to a desired level because the transmission assembly input torque is low prior to the transmission gear shift. In this example, the minimum instantaneous torque which can be delivered via spark reduction is zero Nm. The rear drive unit electric machine provides the remaining portion of the torque reduction during the inertia phase of the transmission gear shift.

The first plot from the top of FIG. 9 is a plot of engine speed versus time. The vertical axis represents engine speed and engine speed increases in the direction of the vertical axis arrow. The horizontal axis represents time and time increases from the left side of the figure to the right side of the figure. Solid line 902 represents engine speed.

The second plot from the top of FIG. 9 is a plot of various transmission torque parameters versus time. The vertical axis represents torque and torque increases in the direction of the vertical axis up arrow. Torque below the horizontal axis is negative torque and magnitude of negative torque increases in a direction of the vertical axis down arrow. The horizontal axis represents time and time increases from the left side of the figure to the right side of the figure. Dash-dot line 904 represents transmission maximum instantaneous torque limit or instantaneous transmission input torque not to be exceeded. Dashed line 906 represents transmission maximum hardware torque limit or transmission hardware not to be exceeded torque. Solid line 908 represents driver demand torque. Dashed line 910 represents transmission input torque. Dash-dot-dot line 912 represents equivalent transmission input torque. Dash-dash-dot line 914 represents transmission minimum instantaneous input torque limit or transmission input torque lower threshold, which transmission input torque is not to be less than. Large dash-small dash-small dash line 916 represents rear drive unit motor torque reflected or observed at the transmission input.

The third plot from the top of FIG. 9 is a plot of various additional transmission torque parameters versus time. The vertical axis represents torque and torque increases in the direction of the vertical axis up arrow. Torque below the horizontal axis is negative torque and magnitude of negative torque increases in a direction of the vertical axis down arrow. The horizontal axis represents time and time increases from the left side of the figure to the right side of the figure. Dotted line 920 represents torque capacity of the transmission's second input clutch (e.g., 127 of FIG. 3). Solid line 922 represents torque capacity of the transmission's first input clutch (e.g., 126 of FIG. 3). Solid line 924 represents transmission input torque with torque modification. Dashed line 910 represents transmission input torque. Dash-dot-dot line 912 represents equivalent transmission input torque.

The fourth plot from the top of FIG. 9 is a plot of transmission torque ratio versus time. The vertical axis represents transmission torque ratio and transmission torque ratio increases in the direction of the vertical axis arrow. The horizontal axis represents time and time increases from the left side of the figure to the right side of the figure. Solid line 930 represents actual transmission torque ratio (e.g., ratio of transmission input torque to transmission output torque). Dashed line 932 represents reported transmission torque ratio (e.g., ratio of transmission input torque to transmission output torque as determined from transmission input speed to transmission output speed). Solid line 930 and dashed line 932 are equivalent when only solid line 930 is visible.

The horizontal axis of each plot corresponds to a value of zero for the vertical axis unless otherwise noted. Further, the vertical axis of each plot corresponds to a value of zero time.

At time T40, the engine speed 902 is increasing and the driver demand torque 908 is a higher level. The transmission input torque 910 and the equivalent transmission input torque 912 are substantially equal. The transmission input torque trace 910 and equivalent transmission input torque trace 912 are shown slightly separated to improve trace visibility. The torque capacity of the transmission's first input clutch 922 is at a higher level and the transmission input torque with modification 924 is at a higher level. The torque capacity of the transmission's second input clutch 920 is zero. The transmission torque ratio 930 is a higher value reflecting that a lower gear is engaged (e.g., $1^{st}$ gear), which provides a higher torque ratio.

At time T41, a power-on upshift begins and the transmission gear shift enters a torque transfer phase. The torque capacity of the transmission's first input clutch (e.g., off-going clutch) starts to be reduced. Shortly thereafter, the transmission minimum instantaneous input torque limit 914 is increased. The transmission input torque 910 and the equivalent transmission torque 912 are increased to follow the transmission minimum instantaneous input torque limit 914. The driver demand torque 908 continues on its present trajectory.

Between time T41 and time T42, the torque capacity of the transmission's second input clutch 920 (e.g., on-coming clutch) begins to increase shortly after the torque capacity of the transmission's first input clutch 922 begins to be reduced. The transmission's actual torque ratio 930 begins to be reduced and the reported transmission torque ratio 932 remains constant. The transmission's first input clutch torque capacity 922 continues to decrease as the first input clutch is opened. The transmission's second input clutch torque capacity 920 continues to increase as the second input clutch is closed. The engine speed 902 continues to increase and the transmission minimum instantaneous torque limit 914 is reduced shortly before time T42.

At time T42, the torque transfer phase of the power-on upshift ends and the inertia phase of the power-on upshift begins. The torque transfer phase ends when the torque capacity of the transmission's first input clutch is zero or substantially zero (e.g., less than 5 Nm). Shortly after the inertia phase begins, the torque capacity of the transmission's second input clutch 920 is increased and then begins to decrease slightly, and then the transmission maximum instantaneous torque limit 904 is reduced to counteract the inertia torque added to the system. The transmission hardware torque limit 906 is also reduced, but to a lesser amount, to protect transmission components. The input torque to the transmission input 910 is reduced via reducing engine torque by retarding spark and/or reducing engine air flow to counteract the inertia torque added to the system. However, the engine and/or ISG may not be able to deliver the full torque reduction. To account for this, the rear drive unit electric machine torque reflected to the transmission input is also reduced from a higher positive torque to a lower positive torque. In this way, the reduction of rear drive unit electric machine torque and engine torque may compensate for the increase of inertia torque. Therefore, vehicle acceleration may be maintained. The transmission input torque 910 (e.g., engine and integrated starter/generator torque) is reduced to zero and the transmission equivalent input torque 912 is reduced to a level below the transmission maximum instantaneous torque limit 904 (a small gap between the traces is used to improve observability), both of which are less than the transmission maximum hardware torque limit 906. The driver demand torque 908 begins to increase after entering the inertia phase of the transmission gear shift.

Between time T42 and time T43, the rear drive unit torque reflected at the transmission 916 is reduced to compensate for the inertial torque increase. The transmission maximum instantaneous torque limit 904 is decreased and then increases near time T43. Likewise, the transmission maximum hardware torque limit 906 is decreased and then increases near time T43. The transmission maximum hardware torque limit 906 is reduced to a level less than the transmission instantaneous torque limit 904. The driver demand torque 908 increases and the transmission input shaft torque 910 is at a level of zero until just before time T43 where it returns to a level equal to the driver demand torque. The equivalent transmission input torque 912 is also at a level of the transmission maximum instantaneous torque limit 904 until just before time T43 where it is returned to the driver demand torque. The transmission's second clutch torque capacity 920 is increased near time T43 and the reported transmission torque ratio 932 is reduced to a level of the actual transmission torque ratio 930. The transmission input torque with modification increases 924.

At time T43, the shift completes and the engine speed continues to accelerate. The driver demand torque 908 is at a higher level, and the transmission input torque 910 and the equivalent transmission torque 912 are substantially equal. The rear drive unit electric machine torque reflected to the transmission input 916 is returned to its value before the transmission gear shift, which is equal to the charging torque.

In this way, inertia torque during the inertia phase of a power-on upshift may be compensated via reducing transmission input torque at the transmission clutch housing. The transmission equivalent input torque may be reduced via reducing the rear drive unit electric machine torque and engine torque. By compensating the inertia torque, it may be possible to reduce driveline torque disturbances.

Referring now to FIG. 10, a method for determining a torque ratio of a transmission is shown. The method of FIG. 10 may be incorporated into and may cooperate with the system of FIGS. 1A-3 and the method of FIG. 4. Further, at least portions of the method of FIG. 10 may be incorporated as executable instructions stored in non-transitory memory while other portions of the method may be performed via a controller transforming operating states of devices and actuators in the physical world.

At 1002, method 1000 judges if an upshift is requested. An upshift is a transmission gear shift from a lower gear (e.g., $1^{st}$ gear) to a higher gear (e.g., $2^{nd}$ gear). An upshift may be requested when the desired gear changes from a lower gear to a higher gear (e.g., shifts from $2^{nd}$ gear to $3^{rd}$ gear) when the vehicle is accelerating or at a vehicle speed where a shift schedule indicates a higher desired gear is desired. The shift schedule may output a desired transmission gear in response to vehicle speed and accelerator pedal position. The desired gear ratios in the shift schedule may be empirically determined. If method 1000 judges that an upshift is requested, the answer is yes and method 1000 proceeds to 1004. Otherwise, the answer is no and method 1000 proceeds to 1030.

At 1004, method 100 judges if a torque transfer phase of the transmission gear shift is active. A transmission gear upshift may be comprised of two phases. The first phase is a torque phase or a torque transfer phase and it is a time during the shift where the off-going clutch is opening, but still transferring torque, and the on-coming clutch is closing and beginning to transfer torque. For the dual clutch transmission shown in FIG. 3, the on-coming clutch may be clutch 126 or clutch 127. The off-going clutch may be clutch 126 or clutch 127. For example, the off-going clutch for a particular gear shift may be clutch 126 and the on-coming clutch may be clutch 127. The second phase of the transmission gear shift is an inertia phase and it begins when the off-going clutch stops transferring torque while the on-coming clutch continues to close and transfer torque. The shift ends when the on-coming clutch is fully closed and there is substantially zero slip (e.g., less than 30 RPM speed difference from the input side of the clutch to the output side of the clutch). In one example, method 400 determines if the torque phase is active in response to a time since start of the off-going clutch. For example, method 1000 may include empirically determined timing values for torque phase and inertia phases for each transmission gear shift (e.g., $1^{st}$ to $2^{nd}$ gear, $2^{nd}$ to $3^{rd}$ gear, etc.). Additionally, the torque and inertia phase times of a shift may be adapted. If the time from the beginning of the shift indicates that the transmission gear shift is in a torque transfer phase, the answer is yes and method 1000 proceeds to 1006. Otherwise, the answer is no and method 1000 proceeds to 1016.

At 1006, method 1000 judges if the transmission torque ratio is to be approximated via measuring transmission input speed and transmission output speed. Method 1000 may judge to approximate the transmission torque ratio via transmission input speed and transmission output speed during conditions where a transmission controller is controlling transfer of torque through the transmission. On the other hand, if a vehicle system controller is controlling torque through the transmission, it may be desirable to determine the transmission torque ratio via transmission clutch torque capacities (e.g., an amount of torque a transmission clutch may transfer from its input to its output). If method 1000 judges that the transmission controls are regulating flow of torque through the transmission and the transmission torque ratio is to be determined via transmission input speed and transmission output speed, the answer is yes and method 1000 proceeds to 1008. Otherwise, the answer is no and method 1000 proceeds to 1009.

At 1008, method 1000 determines the transmission's torque ratio by dividing the transmission output speed by the transmission input speed. The transmission input speed may be determined via an engine speed sensor and the transmission output speed may be determined via a transmission output speed sensor. Method 1000 proceeds to 1010.

At 1010, method 1000 determines a transmission input minimum instantaneous torque limit, which may be referred to as a transmission input instantaneous lower torque threshold. Transmission input torque is required to be greater than or equal to the transmission input minimum instantaneous torque limit. As previously discussed, the vehicle system controller may receive various inputs for requesting braking torque and torque to accelerate the vehicle. For example, the torque to accelerate the vehicle may be input through an accelerator pedal or via an interface with an autonomous driver. In one example, the torque to accelerate the vehicle is a wheel torque that is determined from vehicle speed and accelerator pedal position or a voltage. Specifically, vehicle speed and accelerator pedal position are inputs to a table or function, and the table or function outputs a driver demand wheel torque from a plurality of empirically determined values stored in the table or function. The wheel torque may then be split or partitioned into a driver demand engine torque, driver demand integrated starter/generator torque (if present), and driver demand rear drive unit electric machine torque. The driver demand engine torque, driver demand integrated starter/generator torque, and driver demand rear drive unit electric machine torque may be partitioned in response to battery state of charge (SOC), integrated starter/generator temperature, rear drive unit electric machine temperature, and other vehicle conditions.

For example, if SOC is high and driver demand wheel torque is low, driver demand engine torque and driver demand integrated starter/generator torque may be zero while driver demand rear drive unit electric machine torque provides the driver demand wheel torque. If SOC is low and driver demand is medium, driver demand rear drive unit electric machine torque and driver demand integrated starter/generator torque may be zero while driver demand engine torque provides the driver demand wheel torque. The driver demand engine torque adjusted for transmission gear ratio and rear drive unit gear ratios, plus the driver demand integrated starter/generator torque adjusted for transmission gear ratio and rear drive unit gear ratios, plus the driver demand rear drive unit electric machine torque adjusted for rear drive unit gear ratios, sum to the driver demand wheel torque when the transmission is engaged in a gear.

The driver demand engine torque and/or integrated starter/generator torque (if present) may be modified for transmission clutch slippage, instantaneous transmission torque limits, transmission hardware torque limits, and other transmission conditions so that the desired wheel torque may be provided. For example, if a transmission clutch has a low torque capacity in response to application force applied to the clutch, engine torque may be temporarily reduced to reduce the possibility of clutch degradation. The engine torque during these conditions plus torque of the integrated starter/generator may be referred to as transmission input torque with torque modification. The summed driver demand engine torque and driver demand integrated starter/generator torque determined from the driver demand wheel torque without the modifications for transmission clutch slippage, instantaneous transmission torque limits, transmission hardware torque limits, and other transmission conditions is transmission input torque without modification and it may be expressed via the following equation when the system includes an engine, integrated starter/generator, and a rear drive unit electric machine:

$$Tq_{Tm\_wo\_mod} = \frac{Td_{dd\_whl} - Tq_{Rdu} \cdot Gr_{Rdu}}{Gr_{FD} \cdot Gr_{Tm}}$$

where $Tq_{TnTq\_wo\_mod}$ is transmission input torque without modification, $Tq_{dd\_whl}$ is driver demand wheel torque as determined from accelerator pedal position, $Tq_{Rdu}$ is torque output of the rear drive unit electric machine, $Gr_{Rdu}$ is the rear drive unit torque ratio, $Gr_{Tm}$ is the presently engaged transmission gear ratio, and $Tq_{isg}$ is torque output of the integrated starter/generator.

In one example, method 1000 determines a transmission input minimum instantaneous torque limit or transmission input instantaneous lower torque threshold via the following equation:

$$Tq_{Tm\_min\_inst} = Tq_{TnTq\_wo\_mod} + \left(\frac{RT_{gear\_old}}{RT_{gear\_new}} - 1\right) \cdot Tq_{on\_clth\_cap}$$

where $Tq_{Tm\_min\_inst}$ is the transmission input instantaneous minimum torque limit, $RT_{gear\_old}$ is the transmission torque ratio when the old gear is engaged, $RT_{gear\_new}$ is the transmission torque ratio when the new gear is engaged, $Tq_{TnTq\_wo\_mod}$ is transmission input torque without modification, and $Tq_{on\_cltch\_cap}$ is the torque capacity of the on-coming clutch. The second term of the above equation $$\left(e.g., \left(\frac{RT_{gear\_old}}{RT_{gear\_new}} - 1\right) \cdot Tq_{on\_clth\_cap}\right)$$

is torque applied to fill potential torque holes during the torque transfer phase of the gear shift. The torque capacity of the on-coming clutch may be determined via the following equation:

$$Tq_{on\_clth\_cap} = \frac{RT_{reported}}{RT_{gear\_new}} Tq_{Tm\_wo\_mod}$$

where $Tq_{on\_clth\_cap}$ is the torque capacity of the on-coming clutch, $RT_{reported}$ is the reported transmission torque ratio as determined via dividing output speed of the transmission by input speed of the transmission, $RT_{gear\_new}$ is the torque ratio of the transmission when the transmission is engaged in the new gear, and $Tq_{Tm\_wo\_mod}$ is the transmission input torque without modification. The torque capacity of the off-going clutch may follow a predetermined trajectory stored in controller memory or it may be a calculated value. Method 1000 proceeds to 1012.

At 1012, method 1000 adjusts torque capacities of the off-going and on-coming clutches. The off-going clutch and the on-coming clutch capacities are adjusted via commanding clutch actuators 387 and 389. The on-coming clutch is adjusted to a value of $Tq_{on\_clth\_cap}$ and the off-going clutch is adjusted to a value of a clutch torque capacity trajectory stored in controller memory. In addition, method 1000 adjusts engine and/or integrated starter/generator torque to the value of the transmission input instantaneous lower torque threshold $Tq_{Tm\_min\_inst}$ to fill a torque hole that may develop when the off-going clutch is released. Method 1000 proceeds to exit.

At 1009, method 1000 estimates the transmission input torque. The transmission input torque may be estimated as the value of $Tq_{Tm\_wo\_mod}$ responsive to accelerator pedal position as previously discussed. Method 1000 proceeds to 1011.

At 1011, method 1000 determines and commands the on-coming and off-going clutches. The on-coming clutch capacity may be determined via the following equation:

$$Tq_{on\_clth\_cap} = Tq_{Trn\_wo\_mod} \cdot \frac{t}{T_{ttp}}$$

where $Tq_{on\_cltch\_cap}$ is the on-coming clutch torque capacity, $Tq_{Trn\_wo\_mod}$ is the transmission torque input without modification, t is time elapsed in the torque transfer phase of the present transmission gear shift, $T_{ttp}$ is the desired time duration of the torque transfer phase of the transmission gear shift. The on-coming clutch actuator is commanded to the value of $Tq_{on\_cltch\_cap}$. The value of t may be measured and the value of $T_{ttp}$ may be empirically determined and stored to controller memory. Torque capacity of the off-going clutch is determined via the following equation:

$$Tq_{off\_clth\_cap} = Tq_{Trn\_wo\_mod} \cdot \left(1 - \frac{t}{T_{ttp}}\right)$$

where $Tq_{off\_clth\_cap}$ is the off-going clutch torque capacity, $Tq_{Trn\_wo\_mod}$ is the transmission torque input without modification, t is time elapsed in the torque transfer phase of the present transmission gear shift, $T_{ttp}$ is the desired time duration of the torque transfer phase of the transmission gear shift. The off-going clutch actuator is commanded to the value of $Tq_{off\_clth\_cap}$. The on-coming clutch is commanded to the value of $Tq_{on\_cltch\_cap}$ and the off-going clutch is commanded to the value of $Tq_{off\_catch\_cap}$. Method 1000 proceeds to 1013.

At 1013, method 1000 estimates the transmission torque ratio in response to the off-going clutch capacity and the on-coming clutch capacity. In one example, the transmission torque ratio is determined via the following equation:

$$RT_{actual} = RT_{new} \cdot \frac{Tq_{on\_clth\_cap}}{Tq_{Trn\_wo\_mod}} + RT_{old} \cdot \frac{Tq_{Trn\_wo\_mod} - Tq_{on\_clth\_cap}}{Tq_{Trn\_wo\_mod}}$$

where $RT_{actual}$ is the actual transmission torque ratio, $RT_{new}$ is the transmission torque ratio when the new gear is fully engaged, $RT_{old}$ is the transmission torque ratio when the old gear is fully engaged, $Tq_{on\_cltch\_cap}$ is the capacity of the on-coming clutch, $Tq_{Trn\_wo\_mod}$ is the transmission input torque. This calculation may be used to define the NO path at 1006 and 1016 of FIG. 10. If the reported torque ratio is approximated by the ratio of transmission input speed to transmission output speed, the YES path at 1006 and 1016 is taken.

Method 400 may communicate the actual transmission torque ratio to the vehicle system controller and the vehicle system controller may command the engine and/or the integrated starter/generator to provide a transmission input torque during torque transfer and inertia phases of a gear shift as described at 1010 or via an alternative calculation. For example, the engine and/or integrated starter generator may be commanded to provide a transmission input torque equal to $Tq_{Trn\_min\_inst}$. Method 1000 proceeds to exit.

At 1016, method 1000 judges if the transmission torque ratio is to be approximated or estimated via the transmission speed ratio. Method 1000 may estimate the transmission torque ratio via the transmission speed ratio if the transmission is requesting transmission input torque from the vehicle system controller. If method 1000 judges to estimate the transmission torque ratio via the transmission speed ratio, the answer is yes and method 1000 proceeds to 1018. Otherwise, the answer is no and method 1000 proceeds to 1020.

At 1018, method 1000 determines transmission instantaneous torques. The transmission instantaneous torques may be determined with knowledge of the transmission torque ratio. In one example, the transmission torque ratio is estimated by dividing transmission output speed by transmission input speed. Thus, the transmission torque ratio for an old gear is transmission output speed in the old gear divided by transmission input speed in the old gear. The transmission torque ratio is then used to determine transmission instantaneous torque. The engine and integrated starter/generator torques may be adjusted to provide the transmission instantaneous torque. For example, the engine torque and integrated starter/generator torque may be adjusted to provide a torque equal to a transmission input maximum instantaneous torque limit as determined via the following equation:

$$Tq_{Tm\_inst\_max} = \frac{1}{2} \cdot \left(Tq_{Tm\_in\_newgear} + \frac{RT_{gear\_old}}{RT_{gear\_new}} \cdot Tq_{Tm\_in\_oldgear}\right) - J_{Tm\_in} \cdot \omega_{Tm\_out} \cdot \left(\frac{RT_{gear\_old} - RT_{gear\_new}}{T_{shift\_dur}}\right)$$

where $Tq_{Trn\_inst\_max}$ is the transmission input maximum instantaneous torque limit, $T_{Trn\_in\_newgear}$ is the transmission input torque in the new gear immediately after the on-coming clutch fully closes, $RT_{gear\_new}$ is the torque ratio of the transmission while engaged in the new gear, $RT_{gear\_old}$ is the torque ratio of the transmission while engaged in the old gear, $Tq_{Trn\_in\_oldgear}$ is the transmission input torque in the old gear immediately before the off-going clutch begins to be released during the present gear shift, $J_{Trn\_in}$ is the transmission effective input inertia, $\omega_{Trn\_out}$ is the transmission output shaft angular speed, and $T_{shft\_dur}$ is the duration of the shift or gear ratio change. The value of $Tq_{Trn\_in\_newgear}$ is determined before the new gear is entered and it is based on the transmission input torque immediately before the gear shift and the new gear as described by the following equation:

$$Tq_{Tm\_in\_newgear} = \frac{Tq_{Tm\_in\_oldgear} \cdot TR_{gear\_old}}{TR_{gear\_new}}$$

where $Tq_{Trn\_in\_newgear\ is}$ transmission input torque corresponding to the new transmission gear, $Tq_{Trn\_in\_newgear\ is}$ transmission input torque corresponding to the old transmission gear at the beginning of the transmission gear shift, $TR_{gear\_old}$ is the torque ratio of the old gear, and $TR_{gear\_new}$ is the torque ratio of the new gear. $Tq_{Trn\_in\_newgear\ is}$ determined before the new gear is engaged and before the on-coming clutch is fully engages. Method 1000 proceeds to 1019.

At 1019, method 1000 controls the on-coming and off-going clutches. In one example, the on-coming clutch is adjusted responsive to the following equation:

$$Tq_{on\_clth\_cap} = \frac{RT_{reported}}{RT_{gear\_new}} \cdot Tq_{Tm\_wo\_mod}$$

where Tq$_{on\_clth\_cap}$ is the torque capacity of the on-coming clutch, RT$_{reported}$ is the reported transmission torque ratio as determined via dividing output speed of the transmission by input speed of the transmission, RT$_{gear\_new}$ is the torque ratio of the transmission when the transmission is engaged in the new gear, and Tq$_{Trn\_wo\_mod}$ is the transmission input torque without modification. The off-going clutch may be adjusted responsive to a predetermined clutch torque capacity trajectory stored in controller memory or a calculated off-going clutch capacity. Method 1000 proceeds to exit.

At 1020, method 1000 adjusts the reported transmission torque ratio to the torque ratio of the transmission when the new gear is fully engaged. For example, if the new gear is third gear, the reported transmission torque ratio is adjusted to the torque ratio of the transmission when the transmission is operating in the new gear (e.g., the new gear is fully engaged). The transmission torque ratio for the new gear may be empirically determined and stored in controller memory. Method 1000 proceeds to 1022.

At 1022, method 1000 estimates the transmission input torque without modification. In one example, the transmission torque without modification is determined as described at 1010. Method 1000 proceeds to 1024.

At 1024, method 1000 estimates the inertia torque resulting from the transmission gear ratio change. In one example, the inertia torque resulting from the transmission gear ratio change may be estimated via the following equation:

$$Tq_{Trn\_int} = J_{Trn\_in} \cdot \omega_{Trn\_out} \cdot \left( \frac{RT_{gear\_old} - RT_{gear\_new}}{T_{shft\_dur}} \right) \cdot RT_{gear\_new}$$

where Tq$_{Trn\_int}$ is the transmission inertia torque estimate, RT$_{gear\_new}$ is the torque ratio of the transmission operating in the new gear, RT$_{gear\_old}$ is the torque ratio of the transmission operating in the old gear, J$_{Trn\_in}$ is the transmission effective input inertia, $\omega_{Trn\_out}$ is the transmission output shaft angular speed, and T$_{shft\_dur}$ is the duration of the shift or gear ratio change. Method 1000 proceeds to 1026.

At 1026, method 100 adjusts a wheel torque by subtracting the inertial torque from the engine and integrated starter/generator torque determined from the desired wheel torque. In particular, method 1000 subtracts the inertial torque from the transmission input torque without modification. The engine and integrated starter/generator are commanded to the torque resulting from the subtraction. In this way, inertial torque may be compensated via reducing transmission input torque during the inertial phase of the gear shift. Method 1000 proceeds to exit. At 1030, method 1000 judges if a downshift is requested. A downshift is a transmission gear shift from a higher gear (e.g., 4$^{th}$ gear) to a lower gear (e.g., 3$^{rd}$ gear). A downshift may be requested when the desired gear changes from a higher gear to a lower gear when the vehicle is decelerating or during hard acceleration. The downshift may be based on a schedule that is stored in controller memory. The shift schedule may output a desired transmission gear in response to vehicle speed and accelerator pedal position. The desired gear ratios in the shift schedule may be empirically determined. If method 1000 judges that a downshift is requested, the answer is yes and method 1000 proceeds to 1032. Otherwise, the answer is no and method 1000 proceeds to 1070.

At 1070, method 100 judges if an inertia phase of the transmission gear shift is active. A power-on transmission gear downshift may be comprised of two phases. The first phase is an inertia phase and it is a time during the shift where the torque capacity of the off-going clutch is decreasing while the on-coming clutch is fully open. The reduced torque capacity of the off-going clutch allows the transmission input (e.g., the clutch housing) to accelerate to a synchronous speed of the input shaft delivering torque to the new gear. The synchronizer for the new gear may be engaged so that the input shaft coupled to the new gear rotates at a speed that is a function of the transmission output speed and the ratio of the new gear. The inertia phase ends when the transmission input speed (e.g., housing speed) matches speed of the input shaft coupled to the new gear. During the torque transfer phase, which follows the inertia phase, the on-coming clutch begins to close and the off-going clutch continues to release. In one example, method 1000 may judge that the shift is in an inertia phase when the off-going clutch is being released before the transmission input speed (e.g., clutch housing speed) matches the input shaft speed of the new gear. If method 1000 judges that the shift is in an inertia phase, the answer is yes and method 1000 proceeds to 1034. Otherwise, the answer is no and method 1000 proceeds to 1060.

At 1034, method 1000 judges if the transmission torque ratio is to be approximated via measuring transmission input speed and transmission output speed. Method 1000 may judge to approximate the transmission torque ratio via transmission input speed and transmission output speed during conditions where a transmission controller is controlling transfer of torque through the transmission. On the other hand, if a vehicle system controller is controlling torque through the transmission, it may be desirable to determine the transmission torque ratio via transmission clutch torque capacities (e.g., an amount of torque a transmission clutch may transfer from its input to its output). If method 1000 judges that the transmission controls are regulating flow of torque through the transmission and the transmission torque ratio is to be determined via transmission input speed and transmission output speed, the answer is yes and method 1000 proceeds to 1036. Otherwise, the answer is no and method 1000 proceeds to 1050.

At 1036, method 1000 determines the transmission's torque ratio by dividing the transmission output speed by the transmission input speed. The transmission input speed may be determined via an engine speed sensor and the transmission output speed may be determined via a transmission output speed sensor. Method 1000 proceeds to 1038.

At 1038, method 1000 estimates the inertia torque resulting from the transmission gear ratio change. In one example, the inertia torque resulting from the transmission gear ratio change may be estimated via the following equation:

$$Tq_{Trn\_int} = J_{Trn\_in} \cdot \omega_{Trn\_out} \cdot \left( \frac{RT_{gear\_new} - RT_{gear\_old}}{T_{shft\_dur}} \right) \cdot RT_{gear\_old}$$

where Tq$_{Trn\_int}$ is the transmission inertia torque estimate, RT$_{gear\_new}$ is the torque ratio of the transmission operating in the new gear, RT$_{gear\_old}$ is the torque ratio of the transmission operating in the old gear, J$_{Trn\_in}$ is the transmission effective input inertia, $\omega_{Trn\_out}$ is the transmission output shaft angular speed, and T$_{shft\_dur}$ is the duration of the shift or gear ratio change. Method 1000 proceeds to 1038.

At 1040, method 1000 judges if inertia torque compensation is desired. Inertia torque compensation may be desired during prescribed vehicle speed and wheel torque demand conditions. If method 1000 judges that inertia torque compensation is desired, the answer is yes and method 1000 proceeds to 1042. Otherwise, the answer is no and method 1000 proceeds to 1043.

At 1042, method 1000 determines a transmission minimum instantaneous torque limit, which may be referred to as a transmission lower threshold torque. The transmission instantaneous torque may be determined via the following equation:

$$Tq_{Trm\_min\_inst} = \frac{RT_{reported}}{RT_{gear\_old}} \cdot Tq_{Trm\_wo\_mod} + J_{Trm\_in} \cdot \frac{\omega_{Trm\_out}(RT_{gear\_new} - RT_{gear\_old})}{T_{shft\_dur}}$$

where $Tq_{Trm\_min\_inst}$ is the transmission minimum instantaneous torque limit, $RT_{reported}$ is the reported transmission gear ratio, $RT_{gear\_old}$ is the transmission torque ratio when the old gear is fully engaged, $Tq_{Trm\_wo\_mod}$ is the transmission input torque without modification, $J_{Trm\_in}$ is the transmission effective input inertia, $\omega_{Trm\_out}$ is the transmission output shaft angular speed, and $T_{shft\_dur}$ is the duration of the shift or gear ratio change. Engine and integrated starter/generator torque are commanded such that the sum of engine torque and integrated starter/generator torque equals the value of $Tq_{Trm\_min\_inst}$ to compensate for inertia torque. In this way, transmission input torque is compensates for inertia torque via the second term of the equation $$\left(e.g., J_{Trm\_in} \cdot \frac{\omega_{Trm\_out}(RT_{gear\_new} - RT_{gear\_old})}{T_{shft\_dur}}\right).$$

Method 1000 proceeds to 1044.

At 1044, method 400 determines and commands off-going clutch capacity. In one example, the off-going clutch capacity is determined via the following equation:

$$Tq_{off\_clth\_cap} = \frac{RT_{reported}}{RT_{gear\_old}} \cdot Tq_{Trm\_wo\_mod}$$

where $Tq_{off\_clth\_cap}$ is the torque capacity of the off-going clutch, $RT_{reported}$ is the reported transmission gear ratio, $RT_{gear\_old}$ is the transmission torque ratio when the old gear is fully engaged, and $Tq_{Trm\_wo\_mod}$ is the transmission input torque without modification. The off-going clutch is commanded to the value of $Tq_{off\_clth\_cap}$. Method 1000 exits.

At 1043, method 1000 determines a transmission minimum instantaneous torque limit $Tq_{Trm\_min\_inst}$, which may be referred to as a transmission lower threshold torque. The transmission instantaneous torque may be determined via the following equation:

$$Tq_{Trm\_min\_inst} = \frac{RT_{reported}}{RT_{gear\_old}} \cdot Tq_{Trm\_wo\_mod}$$

where $Tq_{Trm\_min\_inst}$ is the transmission minimum instantaneous torque limit, $RT_{reported}$ is the reported transmission gear ratio, $RT_{gear\_old}$ is the transmission torque ratio when the old gear is fully engaged, and $Tq_{Trm\_wo\_mod}$ is the transmission input torque without modification. Engine and integrated starter/generator torque are commanded such that the sum of engine torque and integrated starter/generator torque equals the value of $Tq_{Trm\_min\_inst}$ and inertia torque compensation is not provided. Method 400 proceeds to 1044.

At 1045, method 400 determines and commands of off-going clutch capacity. In one example, the off-going clutch capacity is determined via the following equation:

$$Tq_{off\_clth\_cap} = \left(\frac{RT_{reported}}{RT_{gear\_old}} \cdot Tq_{Trm\_wo\_mod}\right) - J_{Trm\_in} \cdot \frac{\omega_{Trm\_out}(RT_{gear\_new} - RT_{gear\_old})}{T_{shft\_dur}}$$

where $Tq_{off\_clth\_cap}$ is the torque capacity of the off-going clutch, $RT_{reported}$ is the reported transmission gear ratio, $RT_{gear\_old}$ is the transmission torque ratio when the old gear is fully engaged, $J_{Trm\_in}$ is the transmission effective input inertia, $\omega_{Trm\_out}$ is the transmission output shaft angular speed, and $T_{shft\_dur}$ is the duration of the shift or gear ratio change, and $Tq_{Trm\_wo\_mod}$ is the transmission input torque without modification. The off-going clutch is commanded to the value of $Tq_{off\_clth\_cap}$. Method 1000 proceeds to exit.

At 1050, method 1000 adjusts the reported transmission torque ratio to the torque ratio of the transmission when the new gear is fully engaged. For example, if the new gear is third gear, the reported transmission torque ratio is adjusted to the torque ratio of the transmission when the transmission is operating in the new gear (e.g., the new gear is fully engaged). The transmission torque ratio for the new gear may be empirically determined and stored in controller memory. Method 1000 proceeds to 1052.

At 1052, method 1000 estimates the transmission input torque without modification. In one example, the transmission torque without modification is determined as described at 1010. Method 1000 proceeds to 1054.

At 1054, method 1000 estimates the inertia torque resulting from the transmission gear ratio change. In one example, the inertia torque resulting from the transmission gear ratio change may be estimated via the following equation:

$$Tq_{Trm\_int} = J_{Trm\_in} \cdot \omega_{Trm\_out} \cdot \left(\frac{RT_{gear\_new} - RT_{gear\_old}}{T_{shft\_dur}}\right) \cdot RT_{gear\_old}$$

where $Tq_{Trm\_int}$ is the transmission inertia torque estimate, $RT_{gear\_new}$ is the torque ratio of the transmission operating in the new gear, $RT_{gear\_old}$ is the torque ratio of the transmission operating in the old gear, $J_{Trm\_in}$ is the transmission effective input inertia, $\omega_{Trm\_out}$ is the transmission output shaft angular speed, and $T_{shft\_dur}$ is the duration of the shift or gear ratio change. Method 1000 proceeds to 1056.

At 1056, method determines and commands the on-coming clutch torque capacity and off-going clutch capacity. In one example, the off-going clutch capacity may be determined as described at 1045. The on-coming clutch torque capacity may be determined as described at 1019. Method 1000 commands the clutch torque capacities and proceeds to 1058.

At 1058, method 1000 optionally adjusts a wheel torque by adding the inertial torque from the engine and integrated starter/generator torque determined from the desired wheel torque. In particular, method 1000 subtracts the inertial torque from the transmission input torque without modification. The engine and integrated starter/generator are commanded to the torque resulting from the subtraction. In this way, inertial torque may be compensated via reducing transmission input torque during the inertial phase of the gear shift. Method 1000 proceeds to exit.

At 1060, method 400 judges if the transmission torque ratio is to be approximated or estimated via the transmission speed ratio. Method 1000 may estimate the transmission torque ratio via the transmission speed ratio if the transmission is requesting transmission input torque from the vehicle system controller. If method 1000 judges to estimate the transmission torque ratio via the transmission speed ratio, the answer is yes and method 1000 proceeds to 1062. Otherwise, the answer is no and method 1000 proceeds to 1064.

At 1062, method 1000 estimates the transmission input torque. The transmission input torque may be estimated as the value of $Tq_{Trn\_wo\_mod}$ responsive to accelerator pedal position as previously discussed. Method 1000 proceeds to 1064.

At 1064, method 1000 determines the transmission's torque ratio by dividing the transmission output speed by the transmission input speed. The transmission input speed may be determined via an engine speed sensor and the transmission output speed may be determined via a transmission output speed sensor. Method 1000 proceeds to 1066.

At 1066, method 1000 determines and commands the off-going clutch. The off-going clutch capacity may be determined via the following equation:

$$Tq_{on\_clth\_cap} = Tq_{Trn\_wo\_mod} \cdot \left(1 - \frac{t}{T_{ttp}}\right)$$

where $Tq_{on\_cltch\_cap}$ is the on-coming clutch torque capacity, $Tq_{Trn\_wo\_mod}$ is the transmission torque input without modification, t is time elapsed in the torque transfer phase of the present transmission gear shift, $T_{ttp}$ is the desired time duration of the torque transfer phase of the transmission gear shift. Method 1000 proceeds to 1068.

At 1068, method 1000 determines a transmission minimum instantaneous torque limit $Tq_{Trn\_min\_inst}$, which may be referred to as a transmission lower threshold torque. The transmission instantaneous torque may be determined via the following equation:

$$Tq_{Trn\_min\_inst} = Tq_{on\_clth\_cap} + \frac{RT_{gear\_new}}{RT_{gear\_old}}(Tq_{Trn\_wo\_mod} - Tq_{on\_clth\_cap})$$

where $Tq_{Trn\_min\_inst}$ is the transmission minimum instantaneous torque limit, $RT_{gear\_old}$ is the transmission torque ratio of the original gear, $RT_{gear\_new}$ is the transmission torque ratio when the new gear is fully engaged, and $Tq_{Trn\_wo\_mod}$ is the transmission input torque without modification. Engine and integrated starter/generator torque are commanded such that the sum of engine torque and integrated starter/generator torque equals the value of $Tq_{Trn\_min\_inst}$. Method 1000 proceeds to exit.

At 1063, method 1000 estimates the transmission input torque. The transmission input torque may be estimated as the value of $Tq_{Trn\_wo\_mod}$ responsive to accelerator pedal position as previously discussed. Method 1000 proceeds to 1011.

At 1065, method 1000 determines and commands the on-coming and off-going clutches. The on-coming clutch capacity may be determined via the following equation:

$$Tq_{on\_clth\_cap} = Tq_{Trn\_wo\_mod} \cdot \frac{t}{T_{ttp}}$$

where $Tq_{on\_cltch\_cap}$ is the on-coming clutch torque capacity, $Tq_{Trn\_wo\_mod}$ is the transmission torque input without modification, t is time elapsed in the torque transfer phase of the present transmission gear shift, $T_{ttp}$ is the desired time duration of the torque transfer phase of the transmission gear shift. The on-coming clutch actuator is commanded to the value of $Tq_{on\_cltch\_cap}$. The value of t may be measured and the value of $T_{ttp}$ may be empirically determined and stored to controller memory. Torque capacity of the off-going clutch is determined via the following equation:

$$Tq_{off\_clth\_cap} = Tq_{Trn\_wo\_mod} \cdot \left(1 - \frac{t}{T_{ttp}}\right)$$

where $Tq_{off\_cltch\_cap}$ is the off-going clutch torque capacity, $Tq_{Trn\_wo\_mod}$ is the transmission torque input without modification, t is time elapsed in the torque transfer phase of the present transmission gear shift, $T_{ttp}$ is the desired time duration of the torque transfer phase of the transmission gear shift. The off-going clutch actuator is commanded to the value of $Tq_{off\_cltch\_cap}$. The on-coming clutch is commanded to the value of $Tq_{on\_catch}$ cap and the off-going clutch is commanded to the value of $Tq_{off\_cltch\_cap}$. Method 1000 proceeds to 1013.

At 1067, method 1000 estimates the transmission torque ratio in response to the off-going clutch capacity and the on-coming clutch capacity. In one example, the transmission torque ratio is determined via the following equation:

$$RT_{actual} = RT_{old} \cdot \frac{Tq_{off\_cltch\_cap}}{Tq_{on\_cltch\_cap} + Tq_{off\_cltch\_cap}} + RT_{new} \cdot \frac{Tq_{on\_cltch\_cap}}{Tq_{on\_cltch\_cap} + Tq_{off\_cltch\_cap}}$$

where $RT_{actual}$ is the actual transmission torque ratio, which may alternatively be referred to as the reported transmission torque ratio, $RT_{new}$ is the transmission torque ratio when the new gear is fully engaged, $RT_{old}$ is the transmission torque ratio when the old gear is fully engaged, $Tq_{on\_cltch\_cap}$ is the capacity of the on-coming clutch, $Tq_{Toff\_cltch\_cap}$ is the off-going clutch capacity. Method 1000 may communicate the actual transmission torque ratio to the vehicle system controller and the vehicle system controller may command the engine and/or the integrated starter/generator to provide a transmission input torque during torque transfer and inertia phases of a gear shift. For example, the engine and/or integrated starter generator may be commanded to provide a transmission input torque equal to $Tq_{Trn\_min\_inst}$. Method 1000 proceeds to exit.

At 1070, method 1000 judges if an engine start is requested. An engine start may be requested via a human driver or an automated driver. In one example, method 1000 evaluates a state of a controller input to determine if an engine start is requested. If method 1000 judges that an engine start is requested, the answer is yes and method 1000 proceeds to 1072. Otherwise, the answer is no and method 1000 proceeds to 1071.

At 1071, method 1000 maintains the present transmission's torque ratio if the engine is started. In addition, during some conditions, the transmission clutches may be maintained in an open state if the engine is stopped. Method 1000 proceeds to exit.

At 1072, method 1000 judges if torque capacity of both transmission clutches is greater than zero and if both clutches are transferring torque. Method 1000 may judge that torque capacity of both clutches is non-zero if force applied to close the clutches is non-zero. If method 1000 judges that torque capacity of both transmission clutches is non-zero, the answer is yes and method 1000 proceeds to 1074. Otherwise, the answer is no and method 1000 proceeds to 1073.

At 1073, method 1000 adjusts the transmission torque ratio of the transmission torque ratio when the desired gear is fully engaged. Method 1000 proceeds to exit.

At 1074, method 1000 judges if only the higher gear clutch is slipping. For example, if a first clutch is transferring engine torque to $1^{st}$ gear and a second clutch is transferring engine torque to $2^{nd}$ gear and only the second clutch is slipping, the answer is yes. If method 1000 judges that only the higher gear clutch is slipping, the answer is yes and method 1000 proceeds to 1076. Otherwise, the answer is no and method 1000 proceeds to 1075.

At 1075, method 1000 adjusts the transmission torque ratio that is a weighted average of the transmission torque ratio when the first gear (e.g., gear that is being supplied torque via the first transmission clutch) is fully engaged and the transmission torque ratio when the second gear (e.g., gear that is being supplied torque via the second transmission clutch) is fully engaged. Method 1000 proceeds to exit.

At 1076, method 1000 adjusts the transmission torque ratio to the ratio of the higher gear.

For example, if a first clutch is transferring engine torque to $1^{st}$ gear and a second clutch is transferring engine torque to $2^{nd}$ gear, the transmission torque ratio is set to the transmission torque ratio of $2^{nd}$ gear. Method 1000 proceeds to exit.

In this way, a transmission torque ratio may be reported in response to transmission input speed and transmission output speed. Further, the transmission torque ratio may be reported in response to torque capacities of transmission clutches without use of transmission input and output speeds.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
    adjusting a transmission instantaneous lower torque threshold via a controller in response to a reported transmission torque ratio, a transmission torque ratio in an old gear, and a transmission input torque without modification, the reported transmission torque ratio responsive to an off-going clutch torque capacity and an estimated transmission input torque; and
    adjusting torque of an engine responsive to the transmission instantaneous lower torque threshold via the controller.

2. The method of claim 1, further comprises providing the reported transmission torque ratio during engine starting responsive to clutch torque capacities of two transmission clutches.

3. The method of claim 2, where the clutch torque capacities of the two transmission clutches are non-zero.

4. The method of claim 2, further comprising the reported transmission torque ratio being responsive to two torque ratios of a transmission.

5. The method of claim 4, where a first of the two torque ratios is a torque ratio of the transmission operating in a desired gear.

* * * * *